United States Patent
Pinski et al.

(10) Patent No.: US 12,500,887 B1
(45) Date of Patent: Dec. 16, 2025

(54) AUTOMATED AUTHORIZATION VERIFICATION OF EVENTS RECEIVED FOR AN EVENT BUS

(71) Applicant: Amazon Technologies, Inc., Seattle, WA (US)

(72) Inventors: Nikita Pinski, Vancouver (CA); Catalin Clapon, Vancouver (CA); Sanket Deepak Nayak, Bellevue, WA (US); Nicholas Smit, Vancouver (CA); Denis Delimarschi, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 18/064,915

(22) Filed: Dec. 12, 2022

(51) Int. Cl.
H04L 9/40 (2022.01)

(52) U.S. Cl.
CPC ...... H04L 63/0876 (2013.01); H04L 63/1416 (2013.01)

(58) Field of Classification Search
CPC .......... H04L 63/0876; H04L 63/1416
USPC ............................................. 726/4
See application file for complete search history.

(56) References Cited

U.S. PATENT DOCUMENTS

| | | |
|---|---|---|
| 6,189,043 B1 | 2/2001 | Buyukkoc |
| 8,265,980 B2 | 9/2012 | Ochs et al. |
| 9,185,142 B2 | 11/2015 | Mussman et al. |
| 9,589,041 B2 | 3/2017 | Tran et al. |
| 9,600,553 B1 | 3/2017 | Nigade |
| 9,741,005 B1 | 8/2017 | Adogla |
| 10,148,523 B1 | 12/2018 | Evans |
| 10,474,695 B1 | 11/2019 | Holenstain |
| 10,673,506 B1 | 6/2020 | Dash |
| 10,860,734 B2 | 12/2020 | Hildreth et al. |
| 10,997,000 B1 | 5/2021 | Meyers |
| 11,138,177 B2 | 10/2021 | Levy et al. |
| 11,841,780 B1 | 12/2023 | Baldawa et al. |
| 2005/0262097 A1 | 11/2005 | Sim-Tang |
| 2013/0006933 A1 | 1/2013 | Holden |
| 2017/0242784 A1 | 8/2017 | Heorhiadi |
| 2018/0047009 A1* | 2/2018 | Ayyagari ............. G06Q 20/027 |

(Continued)

FOREIGN PATENT DOCUMENTS

WO  WO-2022222850 A1 * 10/2022 ......... G06Q 30/0248

OTHER PUBLICATIONS

U.S. Appl. No. 17/548,264, filed Dec. 10, 2021, Rishi Baldawa, et al.

(Continued)

*Primary Examiner* — Lan Dai T Truong
(74) *Attorney, Agent, or Firm* — Alexander A. Knapp; Kowert, Hood, Munyon, Rankin & Goetzel, P.C.

(57) ABSTRACT

Methods and apparatuses for the authorization of events received for an event bus service that hosts an event bus are described herein. The event bus service receives a plurality of events that were published from an event publisher. The event bus service determines an authorization scheme for the first event, and information to authenticate the identity of the event publisher of the first event. The event bus service authenticates the first event using the authorization scheme and the information to authenticate the identity of the event publisher. The event bus service provides the authenticated first event to the event bus.

20 Claims, 13 Drawing Sheets

(56) References Cited

U.S. PATENT DOCUMENTS

| | | | |
|---|---|---|---|
| 2019/0028431 A1* | 1/2019 | Keller | H04L 63/101 |
| 2019/0335345 A1 | 10/2019 | Yan et al. | |
| 2020/0349569 A1* | 11/2020 | Murao | G06Q 20/407 |
| 2021/0034571 A1 | 2/2021 | Bedadala | |
| 2021/0073287 A1* | 3/2021 | Hunter | H04L 63/123 |
| 2021/0160143 A1 | 5/2021 | Francis | |
| 2021/0160146 A1 | 5/2021 | Sisman | |
| 2021/0168779 A1 | 6/2021 | Mondal | |
| 2021/0200525 A1 | 7/2021 | Shmouely | |
| 2021/0274387 A1 | 9/2021 | Kousaridas | |
| 2021/0349916 A1 | 11/2021 | Ofenloch | |
| 2021/0409393 A1* | 12/2021 | Murao | H04L 63/123 |
| 2022/0231904 A1 | 7/2022 | Di Martino | |

OTHER PUBLICATIONS

U.S. Appl. No. 17/548,271, filed Dec. 10, 2021, Rishi Baldawa, et al.

U.S. Appl. No. 17/548,291, filed Dec. 10, 2021, Rishi Baldawa, et al.

U.S. Appl. No. 17/306,862, filed May 3, 2021, Jakub Wojciak et al.

* cited by examiner

Event Bus Service  902

Event Bus Service > Resources > Event buses > configures webhooks

Configure webhooks
Enable and configure a HTTP endpoint to receive events from multiple services on the same event bus.

Endpoint  906

Endpoint https://{apiId}.events.invoke.{region}.{provider-network}/{eventbus}/{name}

The endpoint is determined by the selected event bus and can not be edited. However, you can specify more than one optional paths for the endpoints and choose the payload validation.

Path  [Delete]
You can specify more than one optional paths for the endpoint and choose the payload validation Path
[Client path]

Event source
Source of the events. JSON path or constant.
[Client inputs event-source]

Event detail type
JSON Path or constant specifying what fields to expect in the event detail.
[Detail type]

Event detail - optional
JSON Path or constant specifying event detail. It is optional. The default is the entire webhook payload..
[Event detail]

Payload validation
Select the validation method
○ No validation needed
● API key
○ Authentication code
○ IP address filtering
○ User name/password

| Encryption key header | Encryption key value | |
|---|---|---|
| ZENDESK-API-KEY | abcdef12345 | 908 |

[Add another]   Cancel [Update]

*FIG. 9*

*API key validation*

Payload validation  1002
Select the validation method
○ No validation needed
● API key
○ Authentication code
○ IP address filtering
○ User name/password

| Encryption key header | Encryption key value |
|---|---|
| ZENDESK-API-KEY | abcdef12345 |

*Authentication Code validation*

Payload validation  1004
Select the validation method
○ No validation needed
○ API key
● Authentication code
○ IP address filtering
○ User name/password Authentication code algorithms
[SHA-256 ▼]

Secret key
[abcdef-12345]

Event message header name
The name of the event message that will be validated.
[Event-MessageHeader-1]

*IP address filtering*

Payload validation  1006
Select the validation method
○ No validation needed
○ API key
○ Authentication code
● IP address filtering
○ User name/password

| Action | Start IP address | | End IP address - optional | |
|---|---|---|---|---|
| Allow ▼ | 192.168.0.100 | to | | Remove |
| Allow ▼ | 0.0.0.0 | to | 0.0.0.0 | Remove |

*Basic (user name/password) validation*

Payload validation  1008
Select the validation method
○ No validation needed
○ API key
○ Authentication code
○ IP address filtering
● User name/password User name
[Enter user name]
Maximum of 64 characters consisting of lower case letters, upper case letters, ., -, _.

Password
[Enter password]
Maximum of 64 characters consisting of lower case letters, upper case letters, ., -, _.

FIG. 10

AUTOMATED AUTHORIZATION VERIFICATION OF EVENTS RECEIVED FOR AN EVENT BUS

BACKGROUND

A Service Oriented Architecture (SOA), including microservices architecture, is an architecture that decomposes a software application into discrete services that can then be built, deployed, and scaled independently allowing highly scalable and flexible applications. As an application using an SOA grows, the traffic of events that are published and received between the discrete services also grows.

Event-driven architectures can be the cornerstone of building modern applications. Event-driven architectures are a way to build decoupled systems that respond to events as they occur, such as triggering supply chain workflows when a customer orders a product from a website. This behavior can be achieved with the help of an event bus-a piece of software that is responsible for routing events from one service to another. In order to facilitate the complex traffic of events, the event bus system may be used to mediate the events being sent and received and thereby further decouple the various microservices.

BRIEF DESCRIPTION OF THE DRAWINGS

FIG. 9 is an example dialog box presented to a client of an event-bus service for webhook path configuration, according to some embodiments.

FIG. 10 is an example dialog box presented to a client of an event-bus service for the configuration of different payload validation methods, according to some embodiments.

Figure 1:
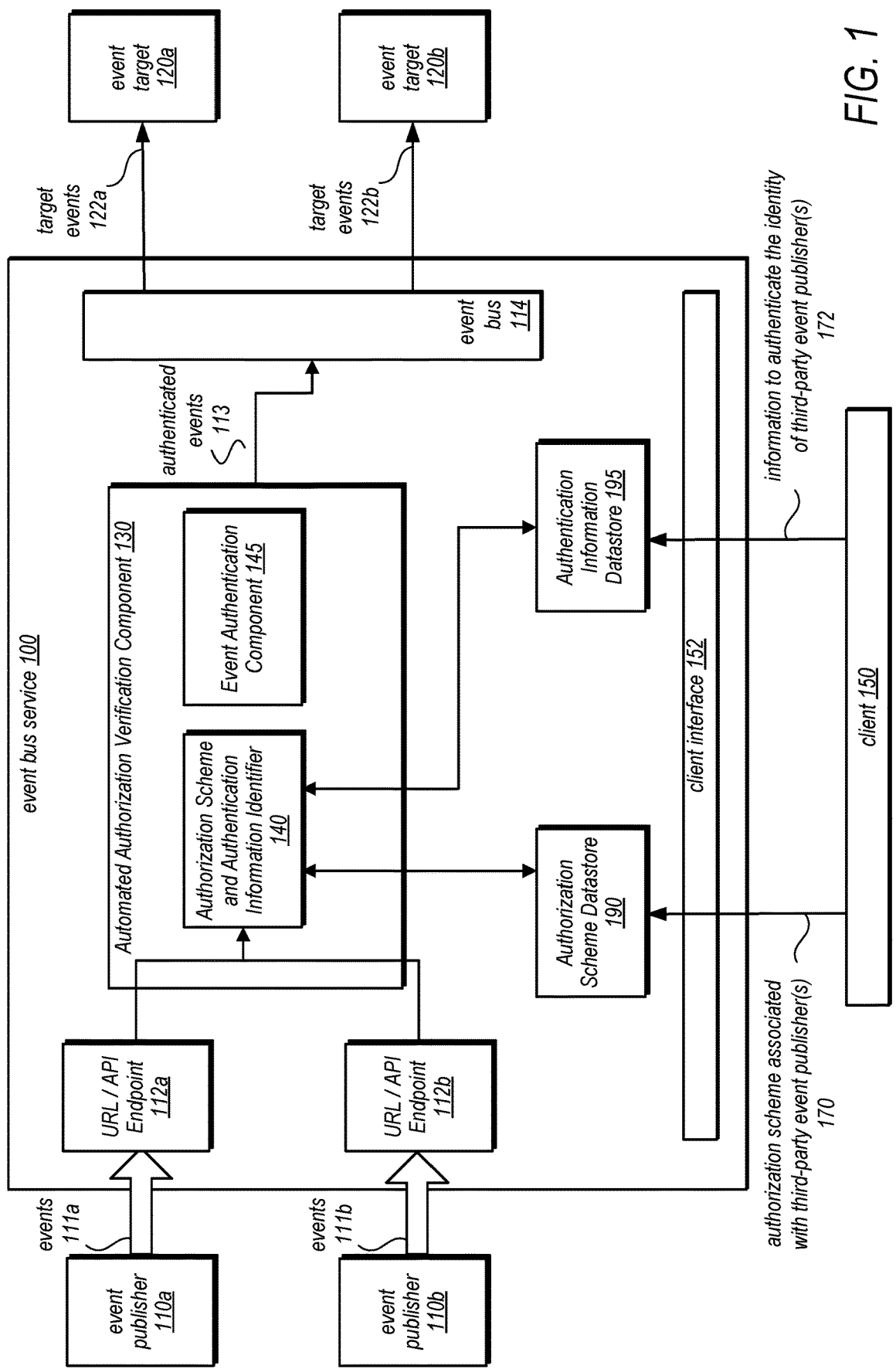
FIG. 1 is a logical block diagram that illustrates automated authorization verification of events received at an event bus from external publishers (e.g., web publishers), according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various techniques for authorization of events received from event producers for an event bus are described herein. Some embodiments described provide the ability to integrate any application as an event source or destination for an event bus service, by giving event busses a unique web address, and supporting generic web addresses as destinations for events. This can enable clients, of a provider network for instance, to easily connect business applications, third-party Software as a Service ("SaaS") providers, and in-house services to an event bus service.

Some embodiments provide webhook support for an event bus service. These embodiments provide a way to integrate web services with applications through standard web addresses. In these embodiments, clients (of a provider network, for instance) can integrate any webhook-enabled web service as an event source, and any web-based application as an event destination for their solutions. This capability removes the need to write custom code or deploy infrastructure to receive and send events to and from any application, while maintaining scalability and robustness provided by the provider network. In these embodiments, clients no longer need to re-create configuration and authentication parts for every service that they want to use in their applications. Webhook support for an event bus service accelerates client time to market, and reduces costs by providing a simple way to build durable integrations.

The ability to use webhooks in an event bus service, as provided by some embodiments, allows clients to spend more of their engineering time on solving hard problems and less time on maintaining custom infrastructure designed to connect services to their application. These embodiments provide ease of use, as well as the flexibility of both inbound (services sending events to the event bus service) and outbound (the event bus service sending events to other services) webhooks. The functionality enables clients to connect any web services to their application, with the ability to control the throughput, authentication, and routing logic with the help of the rules and input transformations of the event bus service. Webhooks in an event bus service, as provided by some embodiments, eliminate the need for clients to worry about service interaction complexity by providing a set of standard options for configuration and connection management.

An event bus system or service may act as a mediator between a variety of event sources and event targets that receive and use events. In various embodiments, an event source for an event bus system may be various applications such as a Software-as-a-Service ("SaaS") applications, an internal service application, or an external service application. Similarly, an event target may be various applications such as a Software-as-a-Service (SaaS) applications, an internal service application, or an external service application. An event bus system may allow for alleviation of tight coupling between different applications acting as event sources and event targets, resolving problems that may arise as more and more services are added. For example, an event bus system may coordinate the various Application Programming Interfaces ("APIs") that are involved in the addition of new services to prevent errors arising from dependencies.

In various embodiments, an event bus system may be able to interact with downstream services by selecting and filtering events, thereby taking on the complexity of ensuring that events are propagated appropriately. For example, events may include various signals, indications, messages, communications, or other notifications of changes to and/or the state of a system that is an event source. This allows the clients and sources to be further decoupled. For example, in order for various services to consume events, instead of updating all of the services involved, the event bus system may route the events to appropriate services according to a rule that determines how the event bus system handles the event. In this way, event bus systems can be adapted to new services to participate in the sending and receiving of events.

Returning to the event source, some embodiments allow a client of an event bus service to use any service that supports webhooks as an event source, as well as to send events to any web-based application that has a web address. Some of these embodiments remove the requirement of writing custom code, using additional infrastructure, and/or the requirement of a high maintenance cost. Webhooks in an event bus service enable clients to receive events from any web service, and then route those to provider network services supported by the event bus service, such as, for example an event-driven compute service, a queue service, continuous delivery pipelines, visual workflow service state machines, or any other web service with a publicly visible web address.

A key value proposition of inbound Webhooks for an event bus service, in some embodiments, is to offer a Hypertext Terminal Protocol (HTTP) endpoint to clients to be able to post payloads (e.g., JavaScript Object Notation (JSON) payloads) directly to an event bus, in some embodiments. Clients can send these payloads directly to the event bus, in some embodiments, without having to worry about authorization, such as for example, Identity and Access Management (IAM) Authentication/Authorization or SigV4 signing. As a client, integrating with a Webhook publisher means providing an endpoint and a secret, in some embodiments. For example, an authorization scheme of the event bus service may be used to perform such authorization. In some embodiments, an authorization scheme may encompass how a secret is formatted, how a secret is to be interpreted, etc. For example, a first Webhook publisher and a second Webhook publisher may use different formatting for formatting their respective secrets, and may also use different procedures for interpreting and/or verifying their respective secrets. In some embodiments, an authorization scheme may inform a recipient of the secret how to use the secret to verify identity and/or authorization. For example, Webhook publishers may generate a secret themselves for their customers to use to perform identity verification of the Webhooks publisher, and some Webhook publishers may generate secrets that are associated with different authorization schemes. The Webhook publisher may then send a custom payload (every Webhook publisher is distinct), hash the request payload with the secret (using a standard scheme like HMAC), and use this as a header signature. Note that the authorization scheme informs a recipient of how to use the secret and the secret itself may comprise information that can be used to authenticate the identity of an event publisher. For example, an event publisher may share an authorization scheme to be used to interpret secrets and may further include a secret with a published event, wherein a recipient uses the authorization scheme to interpret the secret and then uses the secret itself to authenticate the identity of the event publisher.

For example, upon receiving a payload, the client was may hash the payload themselves with their own secret using the same schema, and compare against the signature to validate the caller, then proceed with handling the published event. Offering this as a managed solution for an event bus service means letting a client create an event bus-specific HTTP endpoint, and then specifying: 1) a secret and authorization scheme for validation, and 2) static values or JSON paths to map a given event payload to an event source/detail-type, so the event bus service can map it to a valid call to add/put events. The event bus service then can hash the payload with its received secret using its received schema, compare against the signature to validate the caller, and then proceed with handling the published event.

To start using webhooks in an event bus, clients can use a management console, a command line interface, a software development kit, or a template. To receive events from a web service, clients can create a new webhook path for their event bus, and specify the validation type, enabling them to verify that the events coming to the event bus web address are from an authorized source. To send an event to a web service, clients can create a new rule. Clients might also select a "Generic API" option as the target. Clients can then specify the web address to which the event bus service will send the event, and optionally configure authentication specific to the web service. For example, clients can, in some embodiments, access the console for the event bus service, and create a new webhook path for their event bus. Clients can also configure web addresses as targets for their rules. The clients can specify, in these embodiments, multiple paths for an event bus, allowing them to share it across several services, configure authentication parameters for destinations, as well as set validation rules that will ensure that the incoming events were received from an authorized source. In short, some embodiments allow clients to just configure a path or target API, specify the validation or authentication method, and be instantly ready to receive and send events.

For example, in some embodiments, a client of the event bus service might also be a customer of an e-commerce platform for online retailers, at which that client has established an online website to sell their goods. Such a client might like to setup an event bus at the event bus service to receive events for any activity in their e-commerce account. Such a client can use the functionality provided by some embodiments of the disclosed system and method for the authentication of events received for an event bus. The client can establish an incoming webhook for their event bus that can receive events created from their e-commerce account.

Such a client might perform the following steps related to their event bus service account: Generate an event source endpoint resource specifying the authorization details for the e-commerce platform that will be used to validate the origin of the request. For example, the client might specify that the authorization scheme is "Hmac-SHA256," that the header attribute name which will contain the base64-encoded hash is "X-Shopify-Hmac-SHA256," and that the API Secret will be provided by the e-commerce platform directly to the event bus service. The client might also specify the desired event bus to associate with the event source endpoint. In some embodiments, the client might also specify the event source that will be used to deliver the events. The event source can be a URL or API endpoint, in some embodiments. In other embodiments, the event bus service will create the URL or API endpoint, and provide the client with the address information and/or name of the URL or API endpoint. Then the client can configure a new webhook in the client's e-commerce account by adding the URL and/or API endpoint for the event source endpoint, and linking it to the desired event types, such that the e-commerce account will send webhook communications to the URL and/or API endpoint of the event source endpoint of the event bus service.

Every event bus in the event bus service can have a dedicated web address, that a client can use with web services that support webhooks, in some embodiments. Each endpoint can have one or many paths associated with it, such as: https://default-ddelimar.events.invoke.us-east-2.{provider-network}.com/eventpublisher1 and https://default-ddelimar.events.invoke.us-east-2.{provider-network}.com/eventpublisher2. This option can allow a client to receive events from different event publishers on the same event bus. These event publishers can be third-party services, in some embodiments.

There can be many configurations of the relationship between webhook publishers and event bus service clients, depending on the embodiments. The relationship between webhook publishers and event bus service clients can be: (a) One event publisher to 1 event bus service client; (b) Many event publishers that provide events to 1 event bus service client; (c) One event publisher that provides events to many event bus service clients; and/or (d) Many event publishers that provide many events to many event bus service clients. However, authorization usually occurs on a 1:1 basis. In other words, there is usually a specific authorization for every combination of event publisher and event bus service client, such that events from a specific event publisher for the specific client are authorized using the specific authorization. However, once an event is authorized, it could be sent to any number of destinations by the event bus.

When events occur on third-party services, for example, the third-party service will send an event to the event bus address. After the service sends the event to the event bus service, its integrity and origin will be verified by, for example, validating the originating IP address, basic user credentials, payload signature, or API key. Clients can also configure HTTPS endpoints to only accept events from specific IP addresses or range of addresses, in addition to verifying the integrity of the event through signatures and API keys, in some embodiments. If the event passes verification, the event bus service will process the event and send it to configured targets. If the verification fails, the event bus service will discard the event. The event bus service also allows clients to create rules and input transformations to events received from webhooks, in some embodiments.

Similarly, when sending events from the event bus service to other services through outbound webhooks, a client can configure input transformations that will ensure that the format of the event matches the expectations of the receiving service, in some embodiments. When a rule is triggered, the event bus service will transform the event based on the conditions that are specified, and send it to the configured web service, with authentication information that the client provided when the client set up the rule.

Webhook support in an event bus service can also enable clients to integrate their in-house applications with a provider network, by having the in-house applications send events directly to a web address of the event bus service of the provider network, in some embodiments. Clients do not need to re-architect their in-house applications to be compatible with the event-driven architectures and tools, in these embodiments. By enabling a web address for event buses in the event bus service, in some embodiments, clients can use some of the most popular libraries, tools, and scripts to send event information to a provider network with minimal modifications to the code of the in-house applications. Clients can also configure the event-bus service to send events to their in-house applications, in some embodiments. When configuring new event rules, a client can specify a URL as a target, and provide authentication information, if necessary.

Some embodiments allow developers, who are building applications that integrate with services managed outside the provider network (or outside an existing SaaS partnership with the provider network), integrations in the event bus service. This can be applied to developers in both enterprise shops (where they might work with numerous in-house services that don't have APIs that can easily interoperate with each other or other applications) as well as in smaller businesses and startups (where they might work with a variety of large and small-scale SaaS services that do not offer out-of-the-box application integration capabilities), depending on the embodiment. Some embodiments allow clients the ability to integrate their applications with any third-party or in-house service that supports sending events to a HTTPS endpoint, with minimal setup. This feature significantly increases a client' productivity, and reduces their integration costs. These embodiments allow for the integration with third-party and in-house services as event sources and destinations, with no overhead to the client. With webhooks, any web service that supports sending or receiving events to and from HTTPS endpoints becomes instantly available as an integration for the event bus service.

Some embodiments allow for managed third-party authorization. There can be many ways of performing the managed third-party authorization, depending on the embodiment. In some embodiments, an API endpoint is created in an account of the requesting client of the event bus service. This API endpoint will receive and handle the received event, which can be in the form of a webhook, in these embodiments. However, the event bus service's automated authorization verification components runs authorization for events received at the API endpoint, in some of these embodiments. This can be done in a generic multi-tenant way that can handle multiple authorization schemes, in these embodiments. The event bus service can map the request to metadata that has previously been configured for this webhook. Then, the event can be put on the event bridge bus, assuming the event passed authorization and has been mapped to the webhook, in these embodiments.

In some embodiments, all the various components of a data plane for inbound events can reside in the client's account, other than the authorization. A custom authorizer of the event bus service would not reside in a client's account, but be part of the general event bus service. In other embodiments, the event bus service can own the handler, such as may be included in the data plane, instead of it being located in the client's account. In these embodiments the handler would be an independent handler chain. In some of these embodiments, the event inflow would still be through the customer's account, so there would still be a DNS registration in the customer's account. However, in other embodiments, the event comes through a standard public endpoint. In some of these embodiments, the incoming event would be handled with IAM authorization. In other embodiments, the event flows through newly created endpoints, which have their own authorization logic. This authorization logic can include a generic HMAC authorization, in some embodiments. When authorization is performed on the event bus service's side, the execution of the code can be fully managed in a way that is transparent to clients. Automatic library updates, and fixes can be deployed, and new types of authorization can be supported as needed, in these embodiments.

In some embodiments, the authorization is customizable. For example, a webhook publisher may utilize authorization that requires a call to its respective authorization library (for code components used in the authorization) or may require the use of an SDK provided by the publisher to configure an authorizer on the event receiving side. However, these embodiments provide a generic way to do authorization for any number of publishers that use different authorization configurations. The authorization code can be tuned by the client, in some embodiments (for example by providing entries in a configuration database for the particular publishers from which the customers want to receive webhook events). However, the code for authorization is not operated by the customer, in these embodiments. Instead, the event bus service maintains and executes the authorization code using configurations pulled from the configuration database that has been populated with inputs to correspond to configurations of publishers that the client has indicated an interest in receiving events from.

FIG. 1 is a logical block diagram that illustrates the automated authorization verification of events received for an event bus, according to some embodiments. FIG. 1 includes an event bus service 100 that receives events (111*a*, 111*b*) from a plurality of event publishers (110*a*, 110*b*). Multiple event sources (110*a*, 110*b*) generate events (111*a*, 111*b*) and transmit them to the event bus service 100. Event bus service 100 may be implemented as a service as part of a provider network, such as event bus service 210 discussed below, as well as various other systems or applications that may utilize an event bus system separate from systems implementing event sources 110 and event targets 120. The event sources 110 may be systems, services, or applications such as a Software-as-a-Service (SaaS) applications, an internal or external service application that generates event data or streams of event data. An event may refer to each individual event data that may be published or otherwise sent in various data formats such as JavaScript Object Notation (JSON), Binary JSON (BSON), Extensible Markup Language (XML), YAML Ain't Markup Language (YAML), etc. The events (111*a*, 111*b*) may be an ongoing series of events to make up streams of event data or event streams, in some embodiments.

The event bus service 100 might receive the events (111*a*, 111*b*) at a URL or API endpoint (112*a*, 112*b*) established in the event bus service 100. In some embodiments, the client (150) might have created a URL to receive events from a specific event publisher that publishes events via webhooks. In some embodiments, the URL is in the client's account. When an event is received, the URL or API endpoint (112*a*, 112*b*) can either call the automated authorization verification component (130), or provide the event information to the automated authorization verification component (130). In some embodiments, the URL that received the event in the customer account can call the automated authorization verification component (130) of the event bus service.

The event bus service (100) has previously received, in some embodiments, an authorization scheme associated with third-party event publisher(s) (170) which it can store in the authorization scheme datastore (190), as well as information to authenticate the identity of third-party event publisher(s) (172), which it can store in the authentication information datastore (195). The authorization scheme and authentication information identifier (140) of the automated authorization verification component (130) can fetch the configuration for the authorization code (for that publisher) from the authorization scheme datastore (190). In addition, the authorization scheme and authentication information identifier (140) of the automated authorization verification component (130) can fetch the customer secret from the authentication information datastore (195). In some embodiments, the authentication information might not be stored in a datastore (195) within the event bus service (100), but may be obtained from the client's account, or may be obtained from a separate service that stored authentication information for that client.

Then the event authentication component (145) of the automated authorization verification component (130) can authenticate, on behalf of the client, the received event using the authorization scheme and the information to authenticate the identity of the event publisher. In some embodiments, the automated authorization verification component (130) can map the request to the compute that will perform the authorization. Then, if authorized, the automated authorization verification component (130) can map the event on to the appropriate event bus (114) of the customer's account. Multiple event publishers (110) can be associated with the same event bus 114. The event bus 114, can send the authenticated events (122a, 122b) to one or more event targets (120a, 120b) according to rules for the event bus service associated with the client.

Event bus 114 may receive the authenticated events (113) and route the events to event targets (120a, 120b). Similar to event sources, the event targets may be systems, services, or applications such as a Software-as-a-Service (SaaS) applications, an internal service application that can receive event data or streams of event data. Furthermore, the event targets may be a Hypertext Transfer Protocol (HTTP) invocation endpoint using an API destination. API destinations are targets that can be invoked using an HTTP request. The event bus 130 may invoke an HTTP endpoint wherein the event is sent as a payload within the HTTP request. Various HTTP methods such as GET or POST may be used in the HTTP request.

In a normal flow of events for the processing of incoming events, according to some embodiments, the client (150) that wants to receive events from event/webhook publisher (110a, 110b) creates a secret, or the third-party event publisher has a pre-created secret to share with the client. The client associates that secret with the webhook publisher. The webhook publisher (110a, 110b) can take the event (e.g., in JSON format), hash it, and sign it with the secret, and provides that signature in the header of the request. The client provides that secret to the event bus service (172). The event bus service 100 sees that event comes in for a specific endpoint (associated with the specific client), such as through a URL or API endpoint (112a, 112b). The event bus service 100 (or more specifically, in some embodiments, the automated authorization verification component 130) can then load secret data (associated with a publisher) that is stored for that endpoint (e.g., by the authorization scheme and authentication information identifier (140) of the automated authorization verification component (130)), parse the signature on the request, generate its own signature using our stored secret, and then verify that the signatures match (e.g., by the event authentication component (145) of the automated authorization verification component (130)).

A rule management service can manage the rules in which the event bus service (100) receives and routes authenticated events (113) via defined rules to event targets (120a, 120b). The target events (122a, 122b) result from the event bus applying rules to route the appropriate events to the appropriate event target 120. In various embodiments, rules may be conditions that inform the event bus service how to match incoming events to event targets and route them accordingly (e.g., as discussed in detail below with regard to FIGS. 2 and 3). A single rule can route an event to multiple targets, in some embodiments. Rules may be specified or sent to the rule management service via an interface for event bus 100 and published in various data formats similar to events such as JSON, BJSON, XML, YAML, etc. Rules may be used by the rule management service to process events in parallel and need not be processed in a particular order. A rule management service may include instructions to modify the event to be sent to by the event bus system to the event targets such as passing certain portions of the event or overwriting certain portions of the event with a predefined value.

FIG. 1 is provided as a logical illustration of the event source, events, event bus service, and event targets is not intended to be limiting as to the physical arrangement, size, or number of components, modules, or devices to implement such features. For instance, there may be more than two event sources and event targets that are mediated by the event bus service. There may also be multiple event bus services employing a similar architecture.

Figure 2:
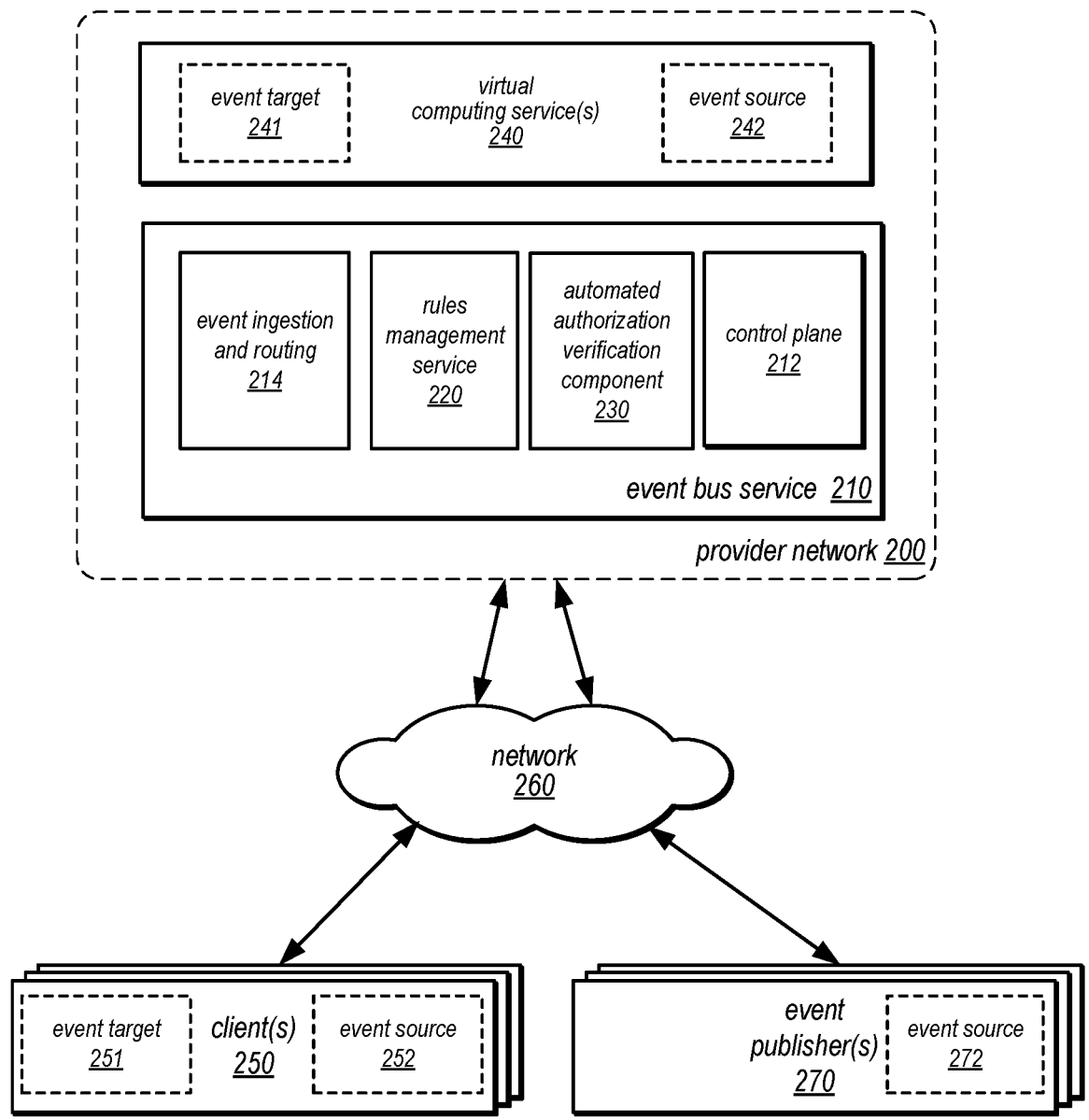
FIG. 2 is a logical block diagram illustrating a provider network that implements an event bus service that supports automated authorization verification of events received at an event bus from external publishers (e.g., web publishers), according to some embodiments.

FIG. 2 is a logical block diagram illustrating a provider network that implements an event bus service, according to some embodiments. A provider network may be a private or closed system or may be set up by an entity such as a company or a public sector organization to provide one or more services (such as various types of virtual computing services) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 1300 described below with regard to FIG. 13), needed to implement and operate the event bus service 210 (including the rule management service 220 and automated authorization component 230 within) and virtual computing services 240 offered by the provider network within the provider network 200. The provider network provisions and patches the one or more data centers hosting various resource pools to allow automatic scaling and built-in high availability. For example, in some embodiments, compute instances of the virtual computing service may be used to implement various other ones of the components, such as those that perform event authentication.

A number of clients (shown as clients 250) may interact with a provider network 200 via a network 260, in some embodiments. The client may be an event source 252 wherein the event source generates events to be transmitted to the event bus service 210. The client may likewise be an event target 251 wherein the event source receives events transmitted by the event bus service 210. The event source 252 may generate events with other event-level policies to give the event bus service granular control, such as the policies to restrict the events to certain regions. In addition, a number of event publishers (shown as event publishers 270) may interact with a provider network 200 via the network 260, in some embodiments. The event publishers may be an event source 272 wherein the event source generates events to be transmitted to the event bus service 210. The event source 272 may generate events with additional event-level policies to give the event bus service granular control, such as the policies to restrict the events to certain regions.

Provider network 200 may implement event bus service 210, rules management service 220, automated authorization verification component 230, control plane 212, event ingestion and routing 214, and/or virtual computing services 240. It is noted that where one or more instances of a given component may exist, reference to that component herein may be made in either the singular or the plural. However, usage of either form is not intended to preclude the other.

In some embodiments, the one or more virtual computing services 240 may be an event target 241 or an event source 242. The respective event target 241 of the virtual computing services 240 may interact with the event bus service 210 to receive events from respective event sources 252 of clients 250 (or event sources 272 of event publishers 270) in various regions as well as from event source 242 in a different provider network region. In other embodiments the respective event source 242 of the virtual computing services 240 may interact with the event bus service 210 to send events to respective event target 251 of clients 250 in various regions as well as to event target 241 in a different provider network region.

In various embodiments, the components illustrated in FIG. 2 may be implemented directly within computer hardware, as instructions directly or indirectly executable by computer hardware (e.g., a microprocessor or computer system), or using a combination of these techniques. Generally speaking, client(s) 250 may encompass any type of clients that can submit network-based services requests to provider network 200 via network 260, including requests for event bus services. For example, a given client 250 may include a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of the event bus service 210 to send events to make available to the virtual computing services for consumption, receive events from event bus service 210, and/or specify rules for events, in some embodiments. In some embodiments, such an application may include sufficient protocol support (e.g., for a suitable version of HTTP) for generating and processing network-based services requests without necessarily implementing full browser support for all types of network-based data. That is, client 250 may be an application that may interact directly with network-based services platform 200. In some embodiments, client 250 may generate network-based services requests according to a Representational State Transfer (REST)-style web services architecture, a document-based or message-based network-based services architecture, or another suitable network-based services architecture.

Although client(s) 250 are illustrated as external to provider network 200, in some embodiments, clients may be implemented within the provider network 200, such as applications or systems implemented on other virtual computing resources that may make use of event bus service 210.

In some embodiments, clients 250 may convey network-based services requests (e.g., events) to and receive responses from provider network 200 via network 260. In various embodiments, network 260 may encompass any suitable combination of networking hardware and protocols necessary to establish network-based communications between clients 250 and provider network 200. For example, network 200 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based event bus service. It is noted that in some embodiments, clients 250 may communicate with provider network 200 using a private network rather than the public Internet. For example, clients 250 may be provisioned within the same enterprise as the event bus service 210. In such a case, clients 250 may communicate with platform 200 entirely through a virtual private network 260 (e.g., a LAN or WAN that may use Internet-based communication protocols but which is not publicly accessible).

Generally speaking, provider network 200 may implement one or more service endpoints may receive and process network-based services requests, such as the receipt of various events and receipt of rules for handling the events. For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements event bus service 210, rules management service 220, automated authorization component 230, and/or another virtual computing service 240 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In some embodiments, provider network 200 may implement various client management features. For example, provider network 200 may coordinate the receiving of events from the clients or the sending of probabilistic data structures and its updates. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of event bus service 210 or virtual computing service(s) 240 (or the underlying systems that implement those services such as the rules management service 220 or automated authorization component 230).

In some embodiments, event bus service 210 may route events received from event sources to one or more event targets according to various rules, which may be specified via an interface for event bus service 210. The traffic and operations of event bus service 210 may broadly be subdivided into two categories in various embodiments: control plane operations carried over a logical control plane and data plane operations carried over a logical data plane Event bus service 210 may implement event ingestion and routing 214, which may act as a data plane for event bus service 210. For example, while the data plane represents the movement of event data through event bus service 210 to an event target, the control plane 212 represents the movement of control signals through event bus service 210. The control plane generally includes one or more control plane components distributed across and implemented by one or more control servers. Control plane traffic generally includes administrative operations, such as system configuration and management (e.g., resource placement, hardware capacity management, diagnostic monitoring, system state information). Data plane traffic generally includes non-administrative operations such as routing of event data. Certain control plane 212 components (e.g., tier one control plane components such as the control plane for event bus service 210) may be implemented on a separate set of servers from the data plane servers, while other control plane 212 components (e.g., tier two control plane components such as analytics services) may share the virtualized servers with the data plane, and control plane 212 traffic and data plane traffic may be sent over separate/distinct networks.

In some embodiments, event bus service 210 may implement user authentication and access control procedures as part of the automated authorization component 230. For example, automated authorization component 230 may determine whether a request is authorized to publish events, specify rules, and/or receive events from event bus service 210. The automated authorization component 230 may determine such authorization by, for example, evaluating an identity, password or other credential against credentials associated with a particular event source requesting the event bus service 210 to ingest an event data. For example, if a client 250 does not have sufficient credentials to publish events to the event bus service 210, the automated authorization component 230 may reject the corresponding network-based services request, for example by returning a response to the requesting client 250 indicating an error condition. Various access control policies may be stored as records or lists of access control information by event bus service 210 and the virtual computing services 240. In some cases, the accounting and/or credentialing services of provider network 200 may be unnecessary for internal clients such as administrative clients or between service components within the same enterprise.

Figure 3:
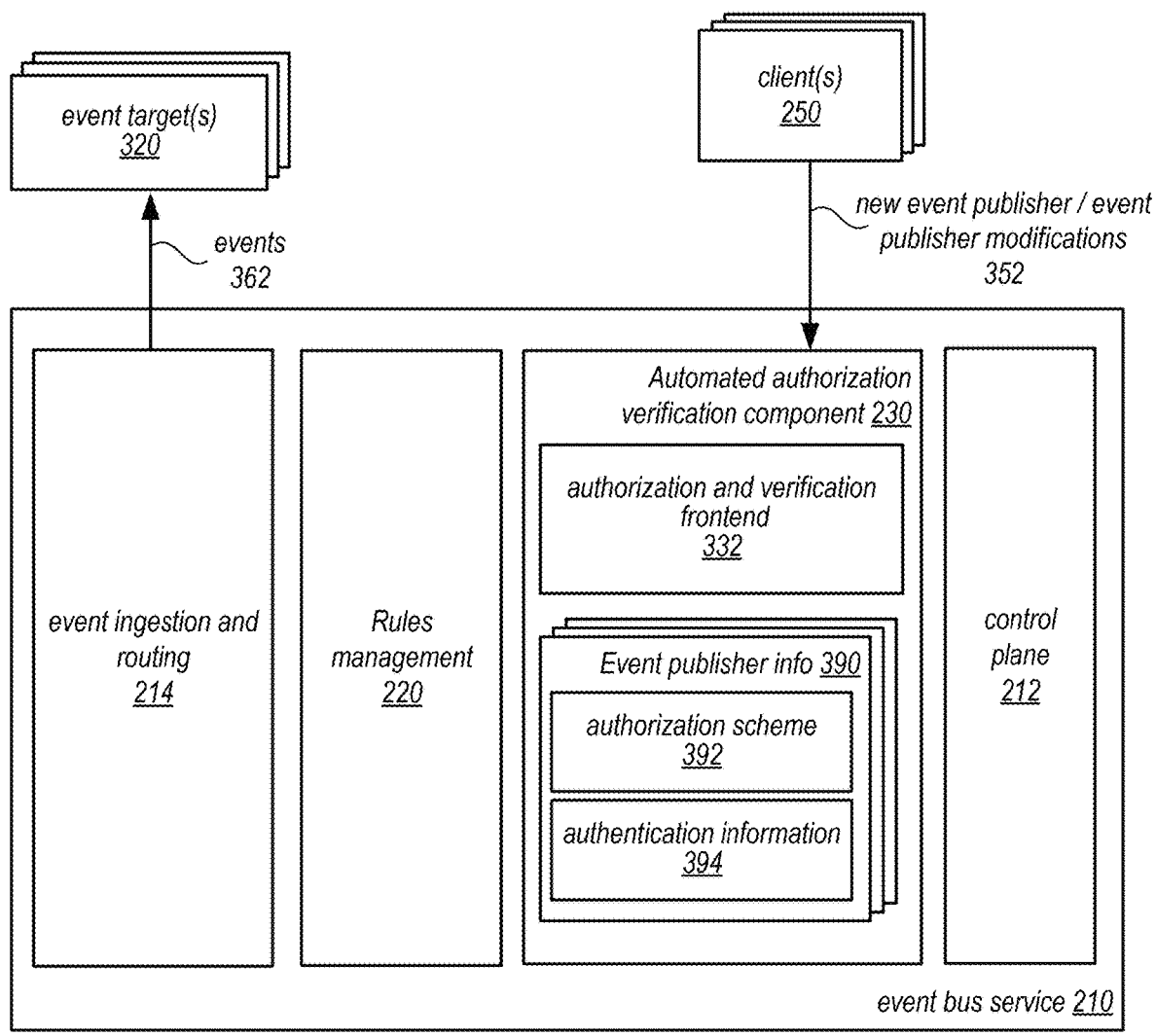
FIG. 3 is a logical block diagram illustrating an event bus service comprising an automated authorization verification component and its interaction with received events and event targets, according to some embodiments.

FIG. 3 is a logical block diagram illustrating the automated authorization verification component and its interaction with received events and event targets, according to some embodiments. In this example, event bus service 210 includes respective rules management service 220, automated authorization component 230, and control plane 212. The control plane 230 may also facilitate authentication and access control procedures and may determine whether the event target is authorized to send new rules/rule modifications 452 to the event bus service 210 or authorized to request a filter.

Event bus service 210 may implement a rule management service 220 that implements rule management frontend. The rule management frontend may receive rules/rule modifications from the event targets 320 or other entities that are authorized to receive events generated by event sources. Rules may be sent to the rule management in various data formats such as JSON, BJSON, XML, YAML, etc.

In some embodiments, event bus service 210 may implement an automated authorization component 230 that implements an authorization and verification frontend (332). In some embodiments, the automated authorization component 230 also comprises event publisher information (390) that can include the authorization scheme (392) and the authentication information (394). In a normal flow of events, the client (150) that wants to receive events from event/webhook publisher 250 creates authentication information (such as a secret), or the third-party event publisher has a pre-created the authentication information (such as the secret) to share with the client. In addition, the client determines what authorization scheme is used to verify events from the event publisher. The client associates that authentication information and/or authorization scheme with the webhook publisher. The client then provides the authentication information and/or the authorization scheme to the event bus service 210, or (in some embodiments) more specifically, the automated authorization verification component 230. The client provides the event bus service 210 (or in some cases, more specifically, the automated authorization verification component 230) what URL and/or API gateway and/or event publisher to associate the provided authentication information (394) and/or authorization scheme (392) with. The event bus service 210 (or in some cases more specifically, the automated authorization verification component 230) stores this provided authentication information (394) and/or authorization scheme (392) in an event publisher information datastore (390). The datastore may not associate the authentication information (394) and/or authorization scheme (392) with a specific event publisher, but may instead associate the information with a specific URL and/or API gateway that receives events (such as webhook communications). The event bus service 210 itself may not know the name, or even any information about, the specific event publisher which is providing events to that URL and/or API gateway.

Information about an event is created by the event publisher when an event occurs. The event publisher (e.g., a webhook publisher) takes the event information (e.g., in JSON format), hashes it, signs it with the secret, and provides that signature in the header of the request. The event bus service 210 sees that event comes in for a specific endpoint (associated with the specific client), such as through a URL or API endpoint. The event bus service 210 (or more specifically, in some embodiments, the automated authorization verification component 230) can then load an authorization scheme 392 and/or authentication information 390 stored for that endpoint (e.g., from the event publisher information 390), parse the signature on the request, generate its own signature using our stored secret, and then verify that the signatures match. If the signatures match, then the event can be provided to the event ingestion and routing 214.

In some embodiments, the rule management service 220 stores rules which are conditions that inform the event ingestion and routing 214 how to match incoming events to event targets and route them to event target(s) 320 accordingly. Rule may comprise event source attribute that describes the source from which the event was generated such as the entity of the event source or the category of event sources. Rule may also comprise event destination attribute that describes the event target 320, in some embodiments. Event destination attribute may include any number of event target attributes such as an entity of the event target, the category of event target, or the location of the event target. Rules may be used by the rule management service 220 to process events in parallel and need not be processed in a particular order. In some embodiments, the rule management service 220 may receive changes to the rules. In some embodiments, the rule management service 220 may determine that changes to rules have been made with respect to rules having a specific event source attribute.

Figure 4:
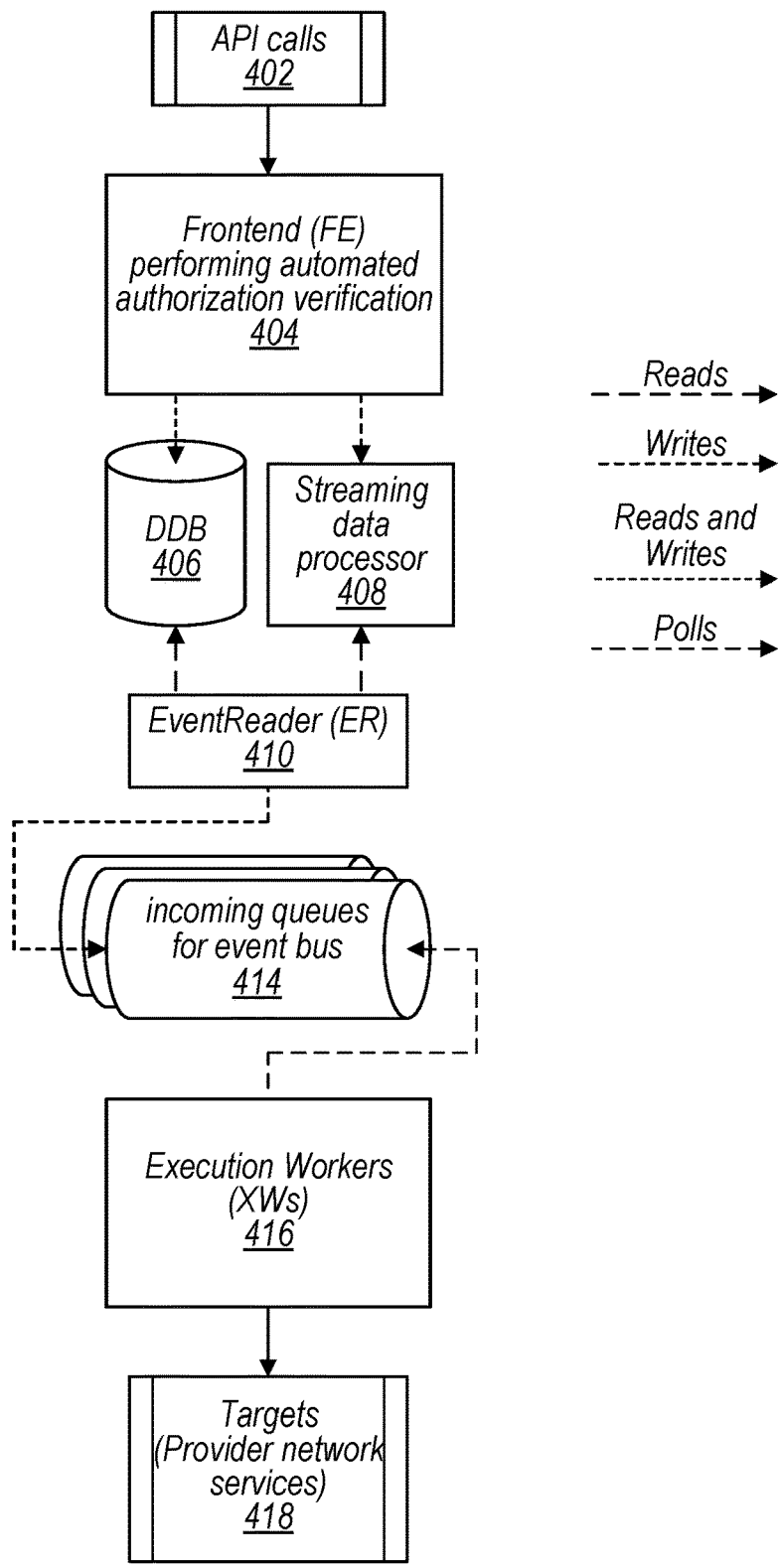
FIG. 4 is a logical block diagram illustrating one embodiment of a data plane for the implementation of automated authorization verification.

FIG. 4 is a logical block diagram illustrating one embodiment of a data plane for the implementation of automated authorization verification. The event bus service can have an API (402) that available to event publishers to call. An event publisher can call one of the provided API calls (402), providing details of an event. A frontend (404) can process the API calls from the event publishers. The frontend (404) can perform the automated authorization verification functionality. When performing the automated authorization verification, the frontend (404) can access an event bus service webhooks account datastore and/or a secrets manager and/or logs to obtain information in order to perform the automated authorization verification of the event.

The frontend (404) can then provide the information about the authenticated published event in to a database (406) and/or can provide the authenticated published event information to a streaming data processor (408). An EventReader (410) can access the database (406) and/or the streaming data processor (408), can obtain an authorized event, and can determine what client or customer the event is associated with. The EventReader (410) can then provide the event to the appropriate incoming queue for the event bus (414) which holds the authenticated events to be processed by the event bus.

An execution worker (416) can then obtain events from a customer queue (414) and process that event. In some embodiments, an execution worker (416) might be associated with a particular client or customer, such that it only obtains events from the queue (414) associated with that client or customer. In some embodiments, there might be a fleet of execution workers (416) with each one assigned to a specific client or customer. In some embodiments, a client or customer can have more than one execution worker (416) assigned to them. In some embodiments, the fleet of execution workers (416) might be executing for multiple clients or customers, such that a particular execution worker processes events for more that one client or customer. In some embodiments, there might be only one execution worker (416) processing events for all the customer queues (414).

When executing, the execution worker (416) can perform the routing of the event bus. If an event is authorized, then the execution worker (416) can perform the functionality of the event bus and provide the authorized event to the appropriate targets (418). The targets (418) of the event bus can be, in some embodiments, provider network services. However, in other embodiments, the targets (418) can be different applications or services outside the provider network, and/or can be a mix of provider network services and applications and/or services outside the provider network.

Figure 5:
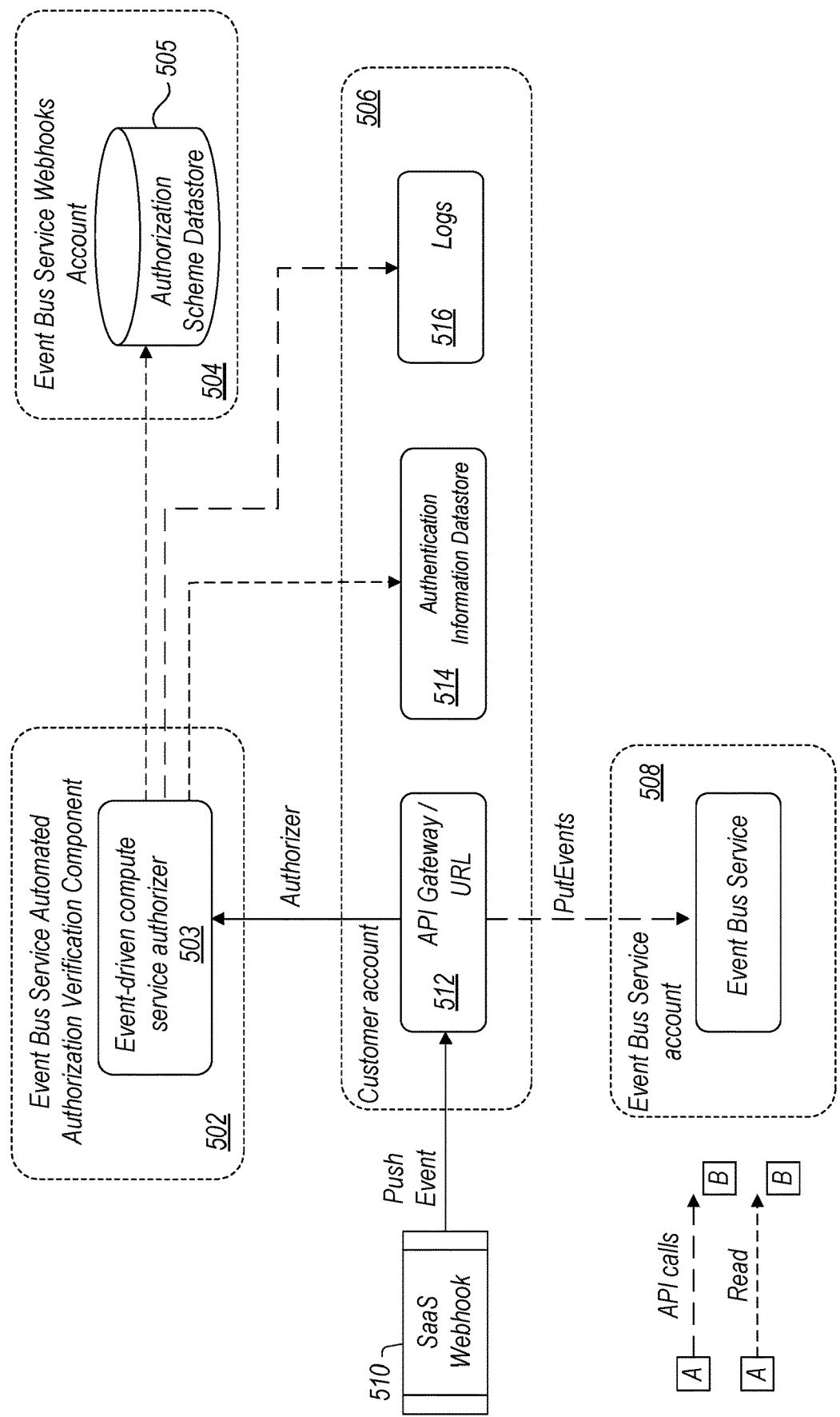
FIG. 5 is a logical block diagram illustrating a different embodiment of a data plane for the implementation of the automated authorization verification component.

FIG. 5 is a logical block diagram illustrating an embodiment of a data plane for the implementation of the automated authorization verification component. To configure such a data plane, a client might generate an "EventSourceEndpoint" resource specifying the authorization details for the e-commerce platform that will be used to validate the origin of a request to the event bus service. For example, the client might specify that the authorization type is "HmacSHA256," that the header attribute name which will contain the base64-encoded hash is "X-Shopify-Hmac-SHA256," and that the API Secret will be provided by the e-commerce platform directly to the event bus service. The client might also specify the desired event bus to associate with the "EventSourceEndpoint" resource. In some embodiments, the client might also specify the event source that will be used to deliver the events. The event source can be a URL or API endpoint (512), in some embodiments. In other embodiments, the event bus service will create the URL or API endpoint (512), and provide the client with the address information and/or name of the URL or API endpoint. After the new URL or API endpoint is generated, then as soon as a new event is generated at an event publisher, such as a SaaS webhook (510), the events will be authorized and then automatically delivered to the event bus of the event bus service account (508) using a PutEvents API. From this point, the client can create rules for the event bus to match these events based on their own usecases.

In some embodiments, the API Gateway/URL component (512) can host the "EventSourceEndpoints" resource. This "EventSourceEndpoints" resource can then initiate the authentication procedure, and then forward the incoming requests to the event bus via a PutEvents API call, in some of these embodiments. In other embodiments, the API Gateway/URL component (512) itself can perform this functionality, without the need for an "EventSourceEndpoints" resource. In order to perform the authorization of events, an external event-driven compute service authorizer (503) of an event bus service automated authorization verification component (502) can perform the authorization. One or more event-driven compute service authorizers (503) can be responsible for authorizing the incoming requests for the "EventSourceEndpoints" resource (or simply the API Gateway/URL component (512) itself).

The one or more event-driven compute service authorizers (503) can decide if the payload of an incoming event can be allowed to be forwarded to the event bus of the event bus service account (508), based at least in part on the stored attributes belonging to the linked "EventSourceEndpoints" resource (or simply the API Gateway/URL component (512)) in the customer account 506. The one or more event-driven compute service authorizers (503) can be part of an event bus service automated authorization verification component (502) that can be horizontally scaled. The one or more event-driven compute service authorizers (503) can also be integrated with logs (516), such as a log service, to give clients a means to track authorization failures and/or to watch for or track malicious event publishers.

The "EventSourceEndpoints" resource can leverage the external event-driven compute service authorizer (503) of an event bus service automated authorization verification component (502) to match the authorization needs of the SaaS provider webhooks (510). The event-driven compute service authorizer (503) can, in some embodiments, extract/generate authorization details from the incoming request, match it with information the customer provided when the "EventSourceEndpoint" was created (or simply the API Gateway/URL component (512) was created), and then return the decision to allow or reject the incoming request. The information the customer provided can be located the authentication information datastore (514) of the customer account (506), and/or the authorization scheme datastore (505) of the event bus service webhooks account (504).

The authorization schemes might be API key based, in some embodiments. The event-driven compute service authorizer (503) can check for authentication information, such as for example a specific key, given by the customer on an incoming request header specified by the 3rd party SaaS providers (510). Presence of that authentication information (e.g., key) in the specified header indicates requests coming from the right source, which is that 3rd party SaaS provider (510). In some embodiments, the event-driven compute service authorizer (503) can use the authentication information (e.g., a secret) provided by the customer to create a HMAC-SHA1/SHA256. The event-driven compute service authorizer (503) can hash the request payload, and compare it with the signature provided in the incoming header specified by the 3rd party SaaS providers (510), in some embodiments. A positive match of that signature in the specified header indicates requests are coming from the right source, which is that 3rd party SaaS provider. In some embodiments, the event bus service automated authorization verification component (502) can also provide IP filtering, such as, for example, to only allow requests received from IPs that are on an IP whitelist. Once events are authenticated, they can be provided to an event bus in an event bus service account (508).

Because the event-driven compute service authorizer (503) is hosted in the event-bus service, it can potentially hit the concurrency usage limits for an event-driven compute service function. While these limits are high, with increased adoption of EventSourceEndpoints, only one event-driven compute service authorizer (503) will not be enough. Therefore, in some embodiments, there can be a framework to manage the event-driven compute service authorizer (503), and/or to monitor the authorizer concurrency usage. This framework can maintains a map of all the event bus service automated authorization verification components (502) and can point to the correct active event bus service automated authorization verification component (502) which can be allocated to new "EventSourceEndpoint" resources. The framework can scale up to provision new automated authorization verification components (502). The framework can, in these embodiments, switch the active component if the concurrency usage of the event-driven compute service authorizer (503) reaches a limit which poses a risk to the exiting clients hosted in it. For this purpose, at any given time in some embodiments only one cell might be considered active and available for new "EventSourceEndpoints." The framework can be responsible with managing the authorizer cells, and to provide access to the active cell, and for the authorizer resources stored in all cells. Any new event-driven compute service authorizer (503) linked to an "EventSourceEndpoint" resource can be created in the active automated authorization verification component (502). Furthermore it can also own processes to monitor the event-driven compute service concurrency usage and to switch the active automated authorization verification components (502).

Figure 6:
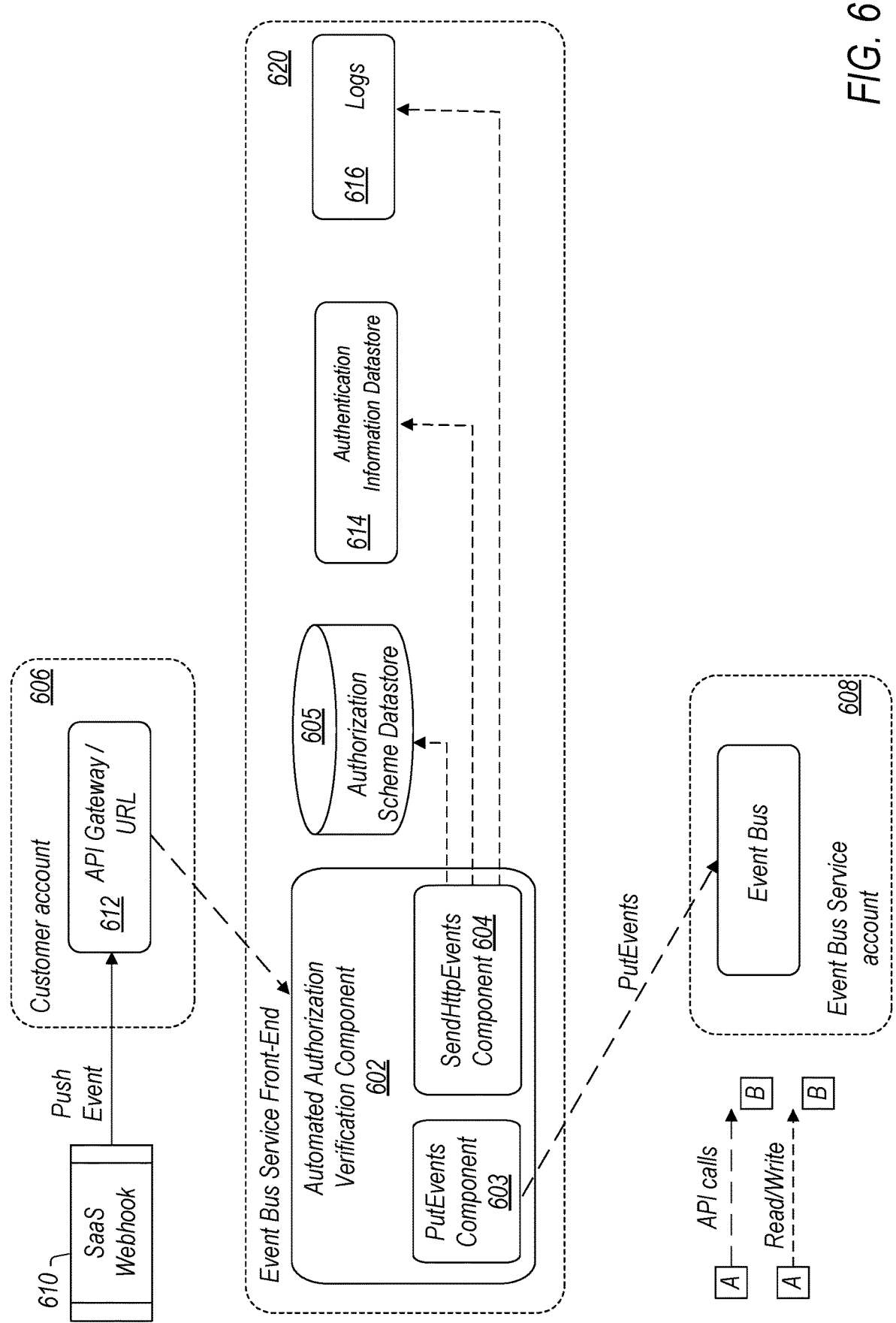
FIG. 6 is a logical block diagram illustrating another embodiment of a data plane for the implementation of the automated authorization verification component.

FIG. 6 is a logical block diagram illustrating another embodiment of a data plane for the implementation of the automated authorization verification component. In FIG. 6, after an event is received from an event publisher, such as an SaaS webhook (610), then the API gateway and/or URL (612) can provide the event to an event bus service front-end (620). The event bus service front-end (620) can include an automated authorization verification component (602). The automated authorization verification component (602) can comprise a SendHttpEvents component (604) and a PutEvents component (603). In some embodiments, the SendHttpEvents component (604) can comprise its own private API that can be called by the API gateway/URL (612) (or the "EventSourceEndpoint" resource of the API gateway/URL (612)). The SendHttpEvents component (604) can be invoked, for example, by the calling its private API, and/or the providing of the information of the event, depending on the embodiment. Once invoked, the SendHttpEvents component (604) can extract a domain of an incoming event, and map to an event bus resource resource, in some embodiments. The SendHttpEvents component (604) can try to fetch an authorization scheme and/or authentication information from a cache. If the scheme and/or information is not present in the cache, then the SendHttpEvents component (604) can attempt to obtain the authorization scheme from the authorization scheme datastore (605), and/or obtain the authentication information from an authentication information datastore (614). In some embodiments, the automated authorization component (602) can also be integrated with logs (616), such as a log service, to give clients a means to track authorization failures and/or to watch for, or track, malicious event publishers.

The SendHttpEvents component (604) can then authorize the event, by for example, mapping the event payload to source/detail-type. The SendHttpEvents component (604) can provide the authorized event to the PutEvents component (603). The PutEvents component (603) can provide the event to the event bus of the event bus service account (608), by for example, calling a PutEvents API. In some embodiments, the SendHttpEvents component (604) can then map the response back to a standard HTTP response.

Figure 7:
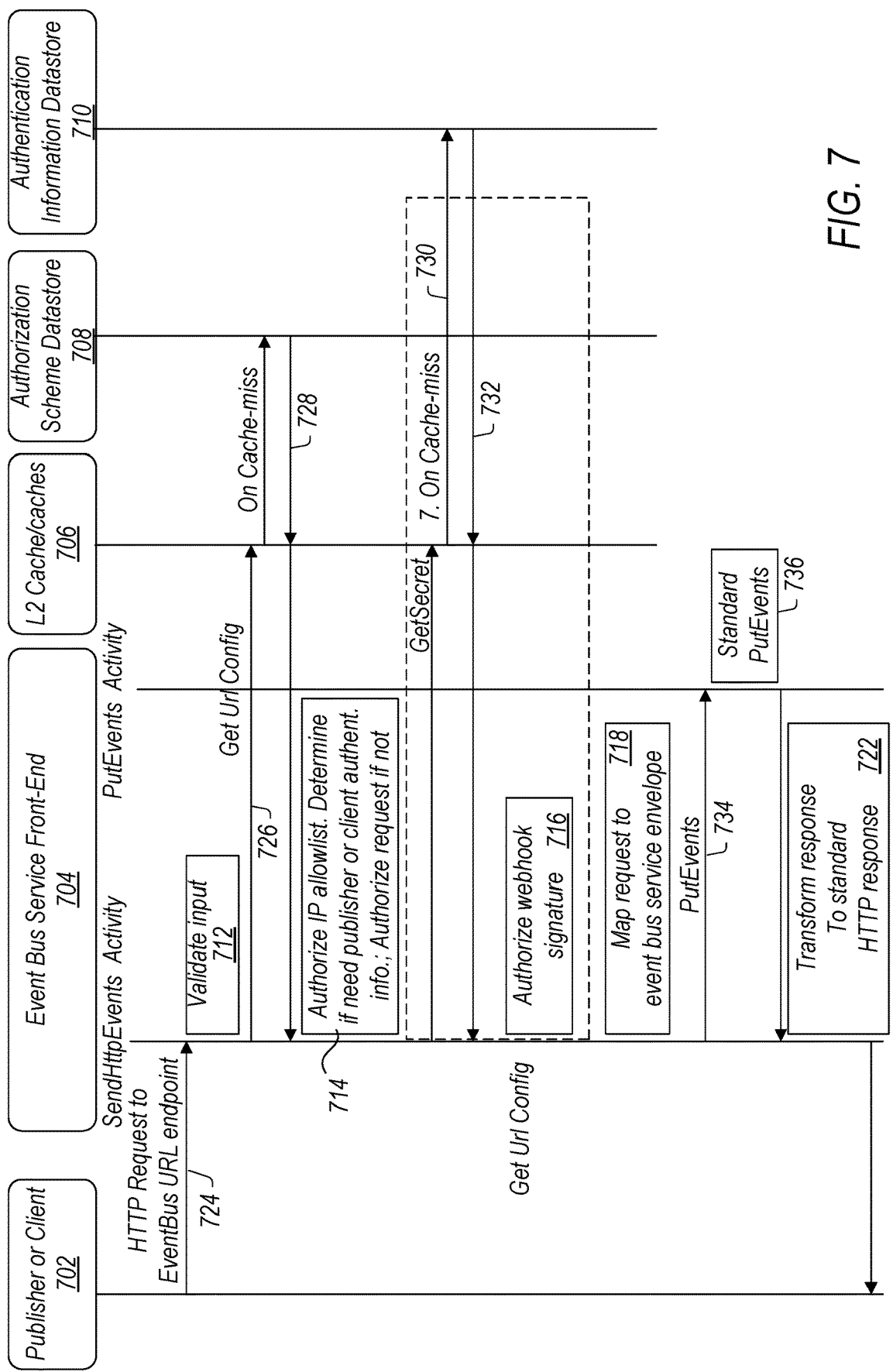
FIG. 7 is a front-end data plane flow diagram for the automated authorization verification of an event received by an event-bus service, according to some embodiments.

FIG. 7 is a front-end data plane flow diagram for the automated authorization verification of an event received by an event-bus service, according to some embodiments. At the start of the front-end data plane flow diagram, an HTTP request (724) comes in from a publisher or client (702) to an EventBus URL endpoint. The event bus service front-end (704) handles the HTTP request from the publisher or client 702. A "SendHttpEvents" resource can be associated with the URL to handle the incoming HTTP request (724). The "SendHttpEvents" resource validates the input 712. Next, the "SendHttpEvents" resource attempts to load the configuration for the authorization code that is to authenticate the request (726). The "SendHttpEvents" resource first attempts to load the configuration for the authorization code from an L2 cache (706). If the configuration is not in the L2 cache (706), then the configuration would need to be loaded from the authorization scheme datastore (708). Either the L2 cache (706) or the authorization scheme datastore (708) returns the configuration to the "SendHttpEvents" resource (728).

In some embodiments, there may be another step to verify the request is from a designated (known to be legitimate) address range for the given webhook publisher (714). The "SendHttpEvents" resource then determines if a publisher and/or client authentication information (e.g., secret) is needed to perform the authorization (714). If the publisher and/or client authentication information (e.g., secret) is not needed, the request is authorized (714). If the publisher and/or client authentication information (e.g., secret) is needed to perform the authorization, the authentication information (e.g., secret) is either fetched from L2 cache (706) or is fetched from the authentication information datastore (710) as shown in 730. In some embodiments, there are two separate L2 caches (706), one for the authorization scheme, one for the authentication information (e.g., secret). In some embodiments, the authentication information (e.g., secrets) are stored in the client's account, but the authentication information datastore (710) can retrieve them from the client account.

Either the L2 cache (706) or the authentication information datastore (710) returns the authentication information (e.g., secret) to the "SendHttpEvents" resource (732). In these embodiments, there will be a publisher and/or client secret associated with the URL from which the event request was received. For example, client A can receive authentication information (e.g., a secret) from publisher B and can store publisher B's authentication information (e.g., secret) as an authorized publisher to provide events to client A. This authentication information (e.g., secret) may be managed by the authentication information datastore (710) on behalf of the client. The client (or publisher) may provide the authentication information (e.g., secret) to the authentication information datastore (710) as an initial webhook setup process, in some embodiments.

Next the "SendHttpEvents" resource uses the configuration for the authorization scheme that is to authenticate the request, as well as the publisher and/or client authentication information (e.g., secret), in order to authorize the webhook signature (716) of the received HTTP request. If the signature is authorized, then the event associated with the authorized request is mapped to an envelope for the event bus service (718). The "SendHttpEvents" resource uses a "PutEvent" call to provide the authenticated event, packaged in the envelope for the event bus service, to the "PutEvents" resource of the event bus service front-end (704). The "PutEvents" resource performs a put-event (736) to put the authenticated events on to the appropriate event bus. The "PutEvents" resource can transform the response to a standard HTTP response (722) which it provides to the SendHttpEvents" resource. The SendHttpEvents" resource provides a response to the client or publisher (702).

Figure 8:
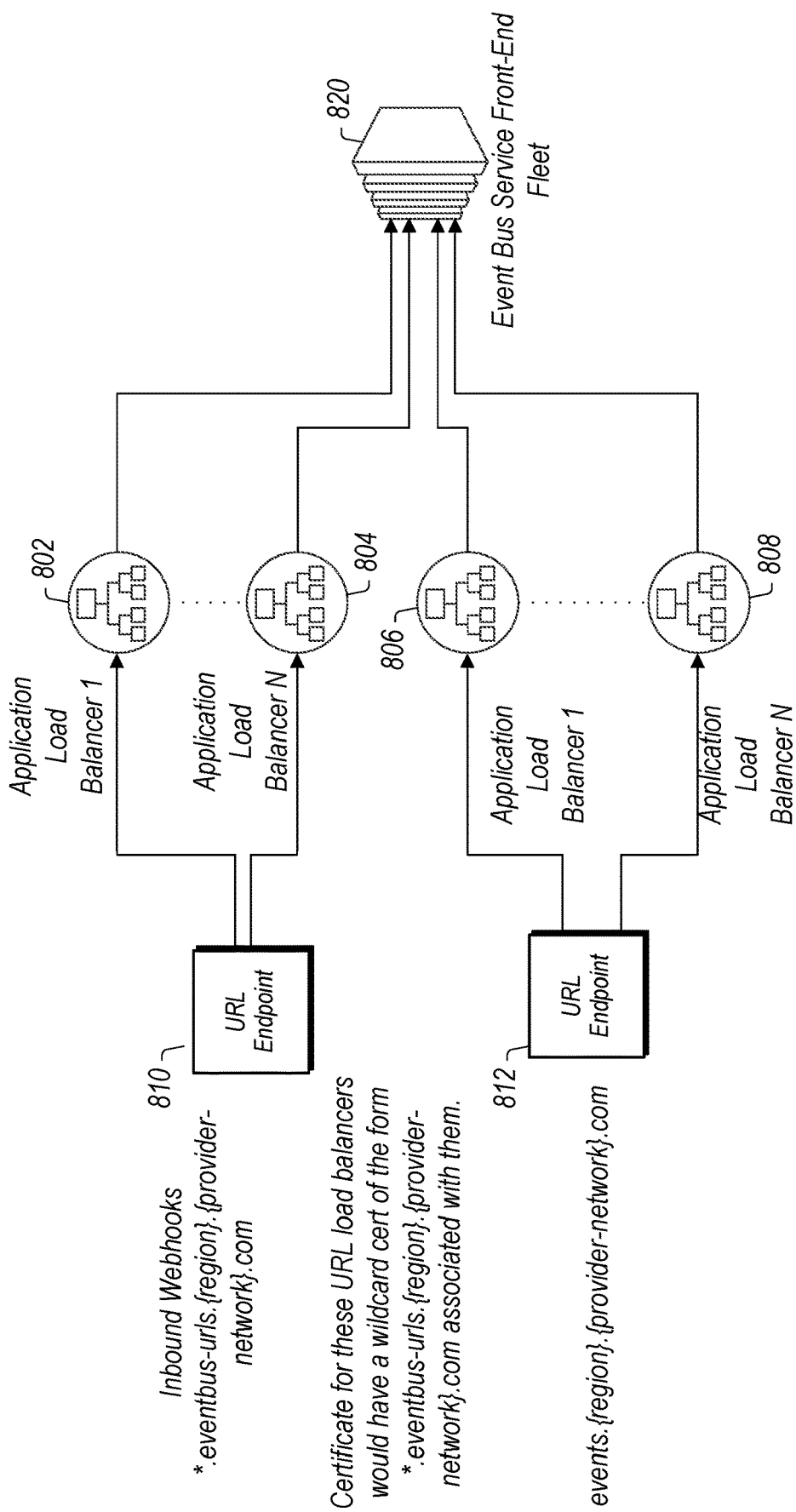
FIG. 8 is a logical block diagram of a load balancer fleet comprising a set of public load balancers dedicated to webhook traffic, which will be coming via dedicated event bus URL domain names, in front of an event bus front-end service fleet, according to some embodiments.

FIG. 8 is a logical block diagram of a load balancer fleet comprising a set of public load balancers dedicated to webhook traffic, which will be coming via dedicated event bus URL domain names, in front of an event bus service front-end fleet, according to some embodiments. In some embodiments, a client can establish an inbound webhook for the client's event bus that can receive events created from event publishers. The client can ask the event bus service to generate a new URL for the event bus, specifying the authorization details that will be used to validate the origin of the request. The event bus service might provide the client with a URL of the form: "*.eventbus-urls.{region}.{providernetwork}.com". The "eventbus-urls" can be naming information that is associated with the client and/or the event publisher and/or the event bus. Certificates for these URL load balancers would have a wildcard certificate of the form "*.eventbus-urls.{region}.{provider-network}.com" associated with them.

Then the client can provide the URL to the appropriate event publisher. For example, the client can configure a new webhook for an event publisher, by adding the URL, and linking it to desired event types, such that the event publisher will provide webhook communications to that URL. In some embodiments, every event bus in the event bus service can have a dedicated web address, that a client can use with web services that support webhooks. Each endpoint can have one or many paths associated with it, such as: "https://default-ddelimar.events.invoke.us-east-2.{provider-network}.com/eventpublisher1" and/or "https://default-ddelimar.events.invoke.us-east-2.{provider-network}.com/eventpublisher2." This option can allow a client to receive events from different event publishers on the same event bus. These event publishers can be third-party services, in some embodiments. When events occur on third-party services, for example, the third-party service will send the event (via a webhooks communication, in some embodiments) to the URL associated with the client's event bus.

In some embodiments, instead of associating specific URLs for specific clients and/or specific event buses, a more generic URL can be used. This more generic URL can be of the form "events.{region}.{provider-network}.com" for example. Event publishers that provide events to this more generic URL would need to contain additional information in their event communication—information which is inherent in the use of the more specific URLs. For example, event publishers may include the event bus and/or client and/or event publisher information within the event communication (such as the webhook). The event bus service can then use this provided additional information for authorization purposes, and/or for associating the provided event with the appropriate event bus, depending on the embodiment. The event bus service can extract a domain of the incoming event, map it to an appropriate event bus resource, fetch authorization information from the cache, map the payload of the event to a source/detail-type, call a standard PutEvents for the event bus, and then map the response back to a standard HTTP response, in some embodiments.

In some embodiments, a load balancer fleet (802, 804, 806, 808) will handle the incoming communication from the URLs, in order to load balance the compute instances of the event bus service front-end fleet (820). In some embodiments, the load balancer fleet comprises a set of public load balancers (802, 806) dedicated to inbound webhook traffic (810), which will be coming via dedicated event bus URL domain names. In some embodiments, certificates for these URL load balancers would have a wildcard cert of the form "*.eventbus-urls.{region}.{provider-network}.com" associated with them. In some embodiments, event publishers will provide events to the more generic URLs (812). In some embodiments, the load balancer fleet comprises a set of public load balancers (806, 808) dedicated to inbound event traffic to these more generic URLs (812).

FIG. 9 is an example dialog box presented to a client of an event-bus service for webhook path configuration, according to some embodiments. The dialog box (902) provides the client with a way to enable and configure an HTTP endpoint to receive events from multiple services on the same event bus. The endpoint (906) is determined by the selected event bus and cannot be edited. For example, the endpoint might be "https://(apiId).events.invoke.(region).{provider-network}/(eventbus)/(name)", for example. Although the client cannot edit the endpoint identification, the client can specify more than one optional paths for the endpoints and choose the payload validation method. In the "Path" sub-dialog box (908), the client can specify more than one optional paths for the endpoint, and choose the payload validation method. The client can specify the path, the event source (such as JSON path or constant), and an event detail type which is a JSON path or constant specifying what fields to expect in the event detail. The client can specify additional optional event detail, which would be a JSON path or constant specifying the event detail. The default, however, is the entire webhook payload if not specified.

The client can then specify one or more payload validations. In the dialog box of FIG. 9, then client has specified an API key type of payload validation. The client has also provided an encryption key header, and the encryption key value at 908.

FIG. 10 is an example dialog box presented to a client of an event-bus service for the configuration of different payload validation methods, according to some embodiments. Item 1002 shows the configuration for API key validation method of payload validation. To bring up this dialog box, the client has selected the "API key" selection. Once "API key" is selected, then the client can enter the encryption key header, and the encryption key value. Item 1004 shows the configuration for an authorization code validation method of payload validation, such as the Hash-based message authentication code ("HMAC") validation method of payload validation. To bring up this dialog box, the client has selected the "Authentication code" selection. Once "Authentication code" is selected, then the client can enter an authorization code algorithm, such as an HMAC algorithm. The client can also enter a secret key, and an event message header name which is the name of the event message that will be validated. Item 1006 shows the configuration for the IP address filtering method of payload validation. To bring up this dialog box, the client has selected the "IP address filtering" selection. Once "IP address filtering" is selected, the client can enter the "start IP address" (and possibly the "end IP address" if a range is to be specified) and the action to associate with this IP address (or IP address range). The action can be "Allow" to allow events received from that IP address (or IP address range). Item 1008 shows the configuration for the basic (user name/password) validation method of payload validation. To bring up this dialog box, the client has selected the "user name/password" selection. Once "user name/password" is selected, the the client can enter the username and password corresponding to the validation.

Figure 11:
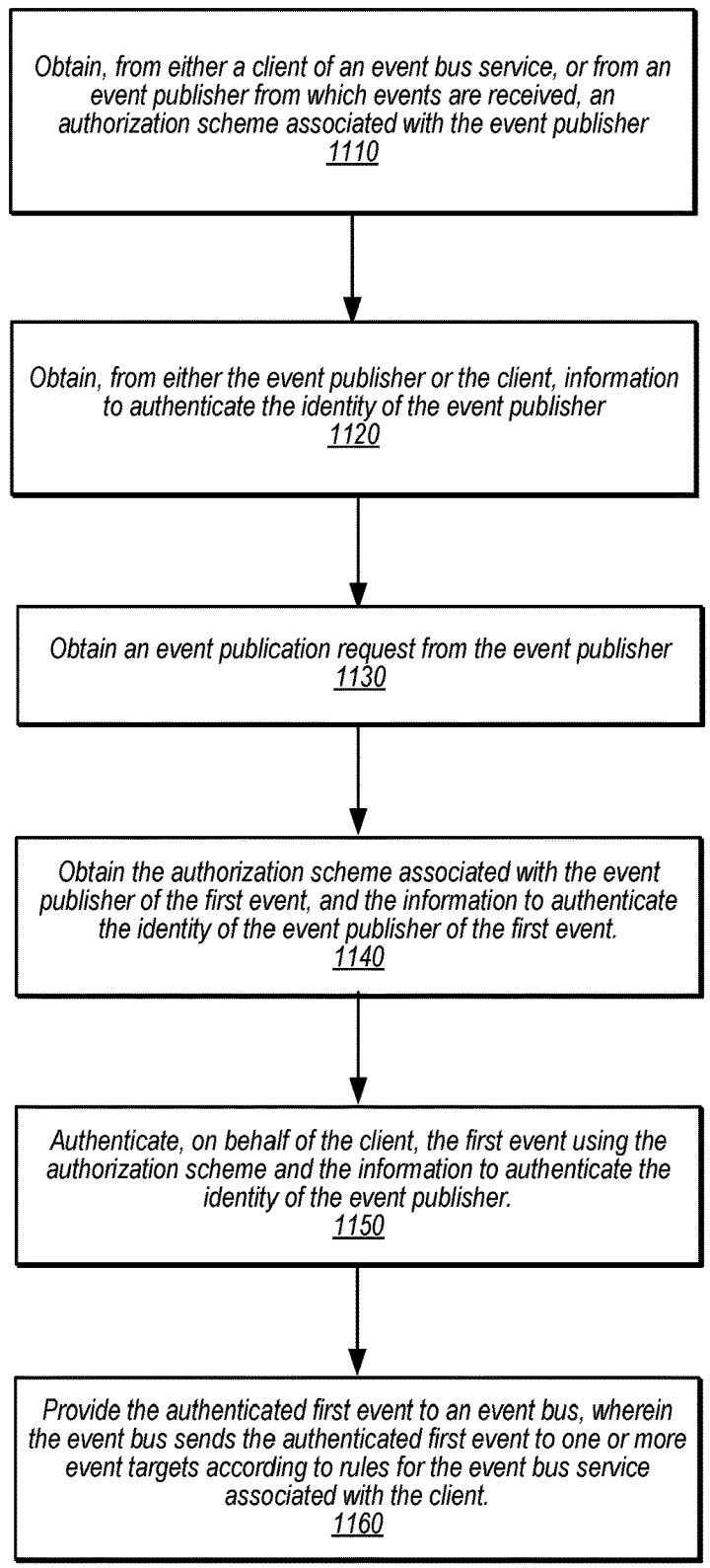
FIG. 11 is a high-level flowchart illustrating various methods and techniques for automated authorization verification of events received for an event bus.

FIG. 11 is a high-level flowchart illustrating various methods and techniques for automated authorization verification of events received for an event bus. The flowchart begins at block 1110 in which an event bus service obtains, from either a client of an event bus service, or from an event publisher from which events are received, an authorization scheme associated with the event publisher. The flowchart transitions to block 1120 where the event bus service obtains, from either the event publisher or the client, information to authenticate the identity of the event publisher. Then in block 1130, the event bus service obtains an event publication request from the event publisher. The event publication request may include a represented identity of the event publisher that needs to be authenticated. In response to the event publication request, the event bus service obtains the authorization scheme associated with the event publisher of the first event, and the information to authenticate the identity of the event publisher of the first event at block 1140. Then at block 1150, the event bus service authenticates, on behalf of the client, the first event using the authorization scheme and the information to authenticate the identity of the event publisher. Then at block 1160, the authenticated first event is provided to an event bus, wherein the event bus sends the authenticated first event to one or more event targets according to rules for the event bus service associated with the client.

Figure 12:
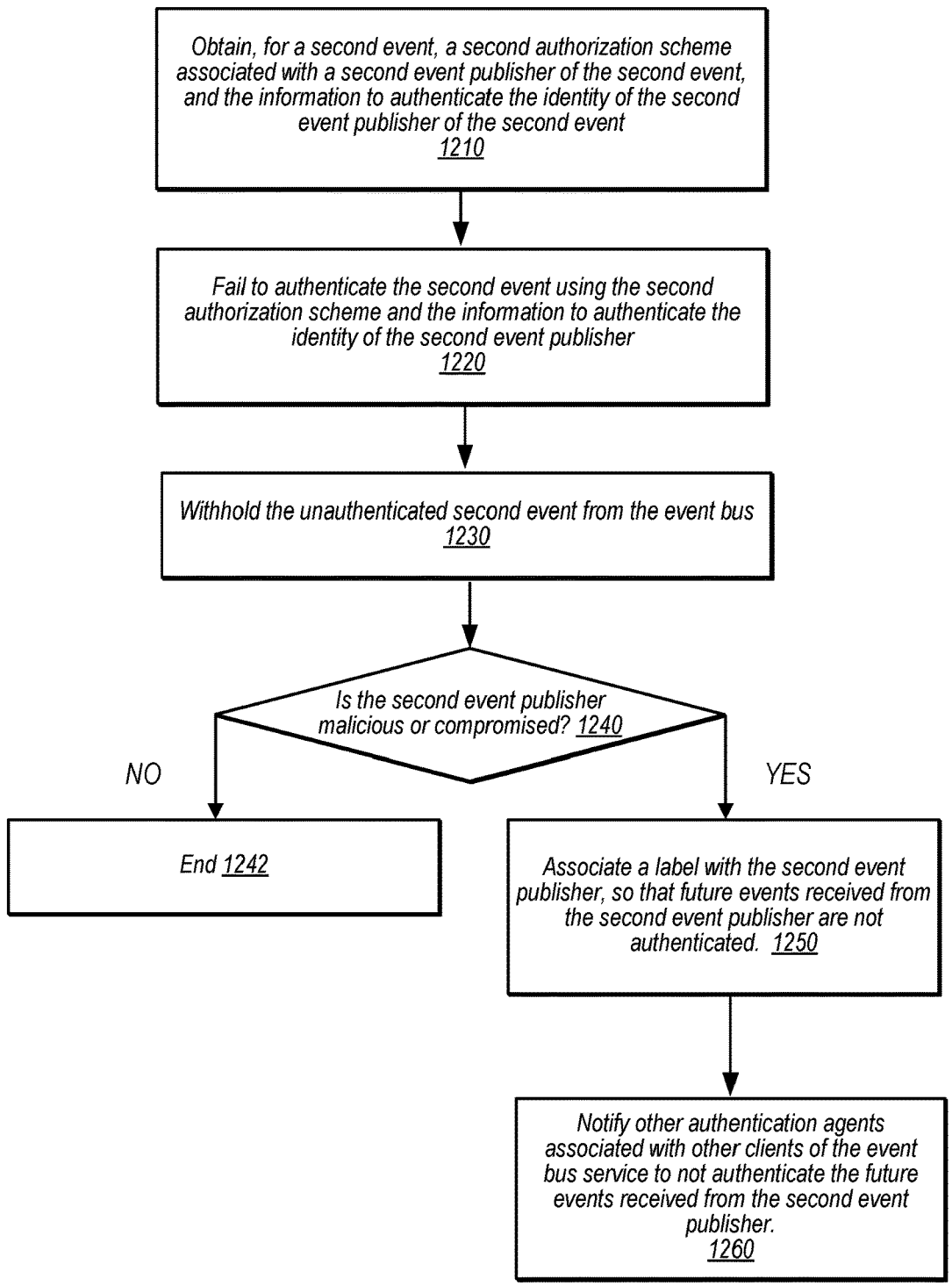
FIG. 12 is a high-level flowchart illustrating various methods and techniques for failing to authorize events received for an event bus, and for determining whether an event publisher is malicious or compromised, according to some embodiments.

FIG. 12 is a high-level flowchart illustrating various methods and techniques for failing to authorize events received for an event bus, and for determining whether an event publisher is malicious or compromised, according to some embodiments. The flowchart begins at 1210 where an event bus service obtains, for a second event, a second authorization scheme associated with a second event publisher of the second event, and the information to authenticate the identity of the second event publisher of the second event. Then, at block 1220, the event bus service fails to authenticate the second event using the second authorization scheme and the information to authenticate the identity of the second event publisher. The flowchart transitions to block 1230 where the event bus service withholds the unauthenticated second event from the event bus. Then, in block 1240, the event bus service determines if the second event publisher is malicious or compromised. For example, the determination may be based on a percentage of unauthorized events originating from the second event publisher, a total number of unauthorized events received from the second event publisher, etc. If the second event publisher is not malicious or compromised, then the flowchart ends at 1242. If, however, the second event publisher is malicious or compromised, then a label is associated with the second event publisher, so that future events received from the second event publisher are not authenticated at block 1250. The flowchart then transitions to block 1260 where other authentication agents associated with other clients of the event bus service are notified to not authenticate the future events received from the second event publisher.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
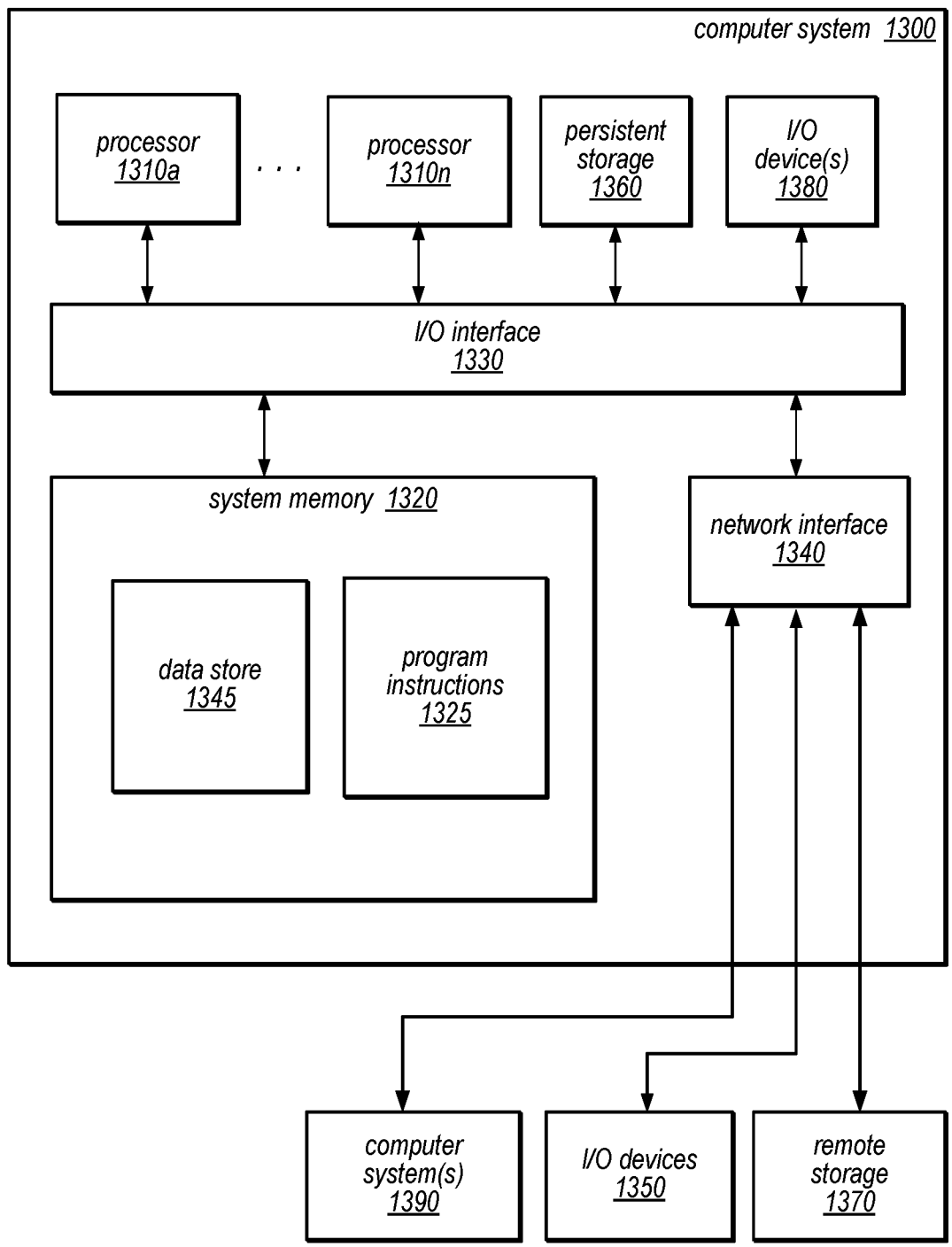
FIG. 13 is a block diagram illustrating an example computer system, according to various embodiments.

FIG. 13 is a block diagram illustrating a computer system, according to various embodiments. For example, computer system 1300 may implement various features of an event source, event bus system, and/or event target, in various embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.). For example, a client application executing on system 1300 may use network interface 1340 to communicate with a server application executing on a single server or on a cluster of servers that implement one or more of the components of the event bus systems described herein.

In the illustrated embodiment, computer system 1300 also includes one or more persistent storage devices 1360 and/or one or more I/O devices 1380. In various embodiments, persistent storage devices 1360 may correspond to disk drives, tape drives, solid state memory, other mass storage devices, or any other persistent storage device. Computer system 1300 (or a distributed application or operating system operating thereon) may store instructions and/or data in persistent storage devices 1360, as desired, and may retrieve the stored instruction and/or data as needed. For example, in some embodiments, computer system 1300 may host a storage system server node, and persistent storage 1360 may include the SSDs attached to that server node.

Computer system 1300 includes one or more system memories 1320 that may store instructions and data accessible by processor(s) 1310. In various embodiments, system memories 1320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ byte-code, or in any other language such as C/C++, Java™, etc., or in any combination thereof. For example, in the illustrated embodiment, program instructions 1325 include program instructions executable to implement the functionality of event bus system or implement event sources or event targets, in various embodiments.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1345, which may be configured as described herein. For example, the information described herein as implementing the rules may be stored in data store 1345 or in another portion of system memory 1320 on one or more nodes, in persistent storage 1360, and/or on one or more remote storage devices 1370, at different times and in various embodiments. Similarly, the information described herein as being stored by the storage tier (e.g., events data, rules, and/or probabilistic data structures) may be stored in data store 1345 or in another portion of system memory 1320 on one or more nodes, in persistent storage 1360, and/or on one or more remote storage devices 1370, at different times and in various embodiments. In general, system memory 1320 (e.g., data store 1345 within system memory 1320), persistent storage 1360, and/or remote storage 1370 may store data blocks, replicas of data blocks, metadata associated with data blocks and/or their state, database configuration information, and/or any other information usable in implementing the methods and techniques described herein.

In one embodiment, I/O interface 1330 may coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may allow data to be exchanged between computer system 1300 and other devices attached to a network, such as other computer systems 1390. In addition, network interface 1340 may allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated in FIG. 13 (e.g., displays, video cards, audio cards, peripheral devices, other network interfaces such as an ATM interface, an Ethernet interface, a Frame Relay interface, etc.)

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices of a provider network configured to implement an event bus service, wherein the event bus service is configured to:
obtain, from either a client of the event bus service, or from an event publisher from which events are to be received, an authorization scheme associated with the event publisher;
obtain, from either the event publisher or the client, information to authenticate an identity of the event publisher, wherein the information indicates a secret to be used to authenticate the identity of the event publisher;
perform, responsive to receiving an event publication request from the event publisher, wherein the event publication request is associated with at least a first event, an automated authorization verification, wherein to perform the automated authorization verification, the event bus service is configured to:
obtain the authorization scheme associated with the event publisher of the first event, and the information to authenticate the identity of the event publisher of the first event;
authenticate, on behalf of the client, the first event using the authorization scheme and the information to authenticate the identity of the event publisher; and
provide the authenticated first event to an event bus, wherein the event bus sends the authenticated first event to one or more event targets according to rules for the event bus service associated with the client.

2. The event bus service of claim 1, wherein the event bus service further comprises:
a first datastore to store the authorization schemes for a plurality of event publishers, including the event publisher; and
a second datastore to store information to authenticate the identity of the plurality of event publishers, including the event publisher;
wherein to obtain the authorization scheme associated with the event publisher of the first event, and the information to authenticate the identity of the event publisher of the first event, the event bus service is further configured to:
determine, based on the event publication request, a represented identity associated with the event publisher;
obtain the authorization scheme associated with the event publisher of the first event from the first datastore based on the represented identity; and
obtain the information to authenticate the identity of the event publisher of the first event from the second datastore based on the represented identity.

3. The event bus service of claim 1, wherein to authenticate the first event, the event bus service is further configured to:
provide the first event to a compute instance of the provider network to perform the authentication of the first event.

4. The event bus service of claim 1, wherein the authenticating the first event is performed by an authentication agent of the event bus service that is associated with the client, and wherein the event bus service is further configured to:
determine that the event publisher is a malicious or compromised publisher;
associate a label with the event publisher, so that future events received from the event publisher are not authenticated by the authentication agent associated with the client;
notify other authentication agents associated with other clients of the event bus service to not authenticate other future events received from the event publisher.

5. A method comprising:
obtaining from an event publisher from which events are received, an authorization scheme associated with an event publisher;
obtaining information to authenticate an identity of the event publisher, wherein the information indicates a secret to be used to authenticate the identity of the event publisher;
performing, by an event bus service, responsive to receiving an event publication request from the event publisher, wherein the event publication request is associated with at least a first event, an automated authorization verification, wherein performing the automated authorization verification further comprises:
obtaining the authorization scheme associated with the event publisher of the first event, and the information to authenticate the identity of the event publisher of the first event;
authenticating, on behalf of the client, the first event using the authorization scheme and the information to authenticate the identity of the event publisher; and
providing the authenticated first event to an event bus, wherein the event bus sends the authenticated first event to one or more event targets according to rules for the event bus service associated with the client.

6. The method of claim 5, wherein obtaining the authorization scheme associated with the event publisher of the first event, and the information to authenticate the identity of the event publisher of the first event, further comprises:
obtaining the authorization scheme associated with the event publisher of the first event from a first datastore comprising a plurality of authorization schemes for a plurality of event publishers; and obtaining the information to authenticate the identity of the event publisher of the first event from a second datastore comprising information to authenticate the identity of the plurality of event publishers.

7. The method of claim 5, further comprising:
providing a unique domain name at which the event bus service can receive events; and
obtaining, from a communication directed to the unique domain name, an inbound webhook from the event publisher comprising the first event.

8. The method of claim 5, further comprising:
receiving an IP address range associated with the event publisher;
wherein the authenticating the first event further comprises:
determining that the first event originated from the IP address range.

9. The method of claim 5, further comprising:
obtaining, for a second event, a second authorization scheme associated with a second event publisher of the second event, and information to authenticate the identity of the second event publisher of the second event;
failing to authenticate the second event using the second authorization scheme and the information to authenticate the identity of the second event publisher; and
withholding the unauthenticated second event from the event bus.

10. The method of claim 9, wherein the failing to authenticate the second event is performed by an authentication agent of the event bus service that is associated with the client, the method further comprising:
determining that the second event publisher is malicious or compromised publisher;
associating a label with the second event publisher, so that future events received from the second event publisher are not authenticated by the authentication agent associated with client;
notifying other authentication agents of the event bus service associated with other clients of the event bus service to not authenticate the future events received from the second event publisher.

11. The method of claim 5, wherein the authenticating the first event further comprises:
providing the first event to a compute instance of a provider network to perform the authentication of the first event.

12. The method of claim 5, wherein the first event comprises a JSON payload, and wherein the authenticating the first event further comprises:
parsing the JSON payload of the first event;
extracting an authorization parameter from the JSON payload of the first event;
comparing the extracted authorization parameter with the information to authenticate the identity of the event publisher of the first event;
determining that the comparing resulted in a successful comparison; and
authenticating the first event based at least in part on a successful comparison.

13. The method of claim 5, further comprising
receiving a plug-in from the event publisher to perform the authorization scheme associated with the event publisher; and
wherein the authenticating the first event further comprises:
authenticating, on behalf of the client, the first event using the plug-in and the information to authenticate the identity of the event publisher.

14. One or more non-transitory computer-readable storage media, storing program instructions that, when executed on or across one or more computing devices of an event bus service of a provider network, cause the one or more computing devices to:
obtain, from either a client of the event bus service, or from an event publisher from which events are received, an authorization scheme associated with the event publisher;
obtain, from either the event publisher or the client, information to authenticate an identity of the event publisher, wherein the information indicates a secret to be used to authenticate the identity of the event publisher;
perform, responsive to receiving an event publication request from the event publisher, wherein the event publication request is associated with at least a first event, an automated authorization verification, wherein performing the automated authorization verification further comprises:
obtain the authorization scheme associated with the event publisher of the first event, and the information to authenticate the identity of the event publisher of the first event;
authenticate, on behalf of the client, the first event using the authorization scheme and the information to authenticate the identity of the event publisher; and
provide the authenticated first event to an event bus, wherein the event bus sends the authenticated first event to one or more event targets according to rules for the event bus service associated with the client.

15. The one or more non-transitory computer-readable storage media of claim 14, storing further instructions that when executed on or across the one or more computing devices of the event bus service, cause the one or more computing devices to further implement:
receive an IP address range associated with the event publisher;
wherein to authenticate the first event, the storage media stores further instructions that when executed on or across the one or more computing devices of the event bus service, cause the one or more computing devices to further implement:
determine that the first event was sent from the IP address range.

16. The one or more non-transitory computer-readable storage media of claim 14, storing further instructions that when executed on or across the one or more computing devices of the event bus service, cause the one or more computing devices to further implement:
obtain, for a second event, a second authorization scheme associated with a second event publisher of the second event, and information to authenticate the identity of the second event publisher of the second event;
fail to authenticate the second event using the second authorization scheme and the information to authenticate the identity of the second event publisher; and
withhold the unauthenticated second event from the event bus.

17. The one or more non-transitory computer-readable storage media of claim 14, wherein the authenticating the first event is performed by an authentication agent associated with the client, and wherein the storage media stores further instructions that when executed on or across the one or more computing devices of the event bus service, cause the one or more computing devices to further implement:
- determine that the event publisher is malicious or compromised publisher;
- associate a label with the event publisher, so that future events received from the event publisher are not authenticated by the authentication agent associated with client;
- notify other authentication agents associated with other clients of the plurality of clients to not authenticate the future events received from the event publisher.

18. The one or more non-transitory computer-readable storage media of claim 14, wherein the first event of the plurality of events comprises a JSON payload, and wherein to authenticating the first event, the storage media stores further instructions that when executed on or across the one or more computing devices of the event bus service, cause the one or more computing devices to further implement:
- parse the JSON payload of the first event;
- extract an authorization parameter from the JSON payload of the first event;
- compare the extracted authorization parameter with the information to authenticate the identity of the event publisher of the first event;
- determine that the comparing resulted in a successful comparison; and
- authenticate the first event based at least in part on a successful comparison.

19. The one or more non-transitory computer-readable storage media of claim 14, storing further instructions that when executed on or across the one or more computing devices of the event bus service, cause the one or more computing devices to further implement:
- receive a plug-in from the event publisher to perform the authorization scheme associated with the event publisher; and
- wherein the authenticating the first event further comprises:
- authenticate, on behalf of the client, the first event using the plug-in and the information to authenticate the identity of the event publisher.

20. The one or more non-transitory computer-readable storage media of claim 14, wherein to obtain the authorization scheme associated with the event publisher of the first event, and the information to authenticate the identity of the event publisher of the first event, the storage media stores further instructions that when executed on or across the one or more computing devices of the event bus service, cause the one or more computing devices to further implement:
- obtain the authorization scheme associated with the event publisher of the first event from a first datastore comprising a plurality of authorization schemes for a plurality of event publishers; and
- obtain the information to authenticate the identity of the event publisher of the first event from a second datastore comprising information to authenticate the identity of the plurality of event publishers.

* * * * *